(12) United States Patent
Purusothaman

(10) Patent No.: US 9,203,713 B2
(45) Date of Patent: Dec. 1, 2015

(54) SYSTEM AND METHOD FOR CREATING AND ESTABLISHING A WORKFLOW BASED TEMPLATE FOR A DOMAIN SERVER OR IP SERVER IN DATACENTERS

(71) Applicant: PAYODA INC., Plano, TX (US)

(72) Inventor: Anand Purusothaman, Jersey, NJ (US)

( * ) Notice: Subject to any disclaimer, the term of this patent is extended or adjusted under 35 U.S.C. 154(b) by 316 days.

(21) Appl. No.: 13/781,978

(22) Filed: Mar. 1, 2013

(65) Prior Publication Data
US 2013/0254381 A1    Sep. 26, 2013

(30) Foreign Application Priority Data

Mar. 2, 2012 (IN) .............................. 800/CHE/2012

(51) Int. Cl.
G06F 15/173 (2006.01)
H04L 12/26 (2006.01)
H04L 12/24 (2006.01)

(52) U.S. Cl.
CPC .............. H04L 43/045 (2013.01); H04L 41/20 (2013.01); H04L 41/22 (2013.01); H04L 43/08 (2013.01); H04L 43/14 (2013.01); H04L 41/06 (2013.01); H04L 41/0803 (2013.01)

(58) Field of Classification Search
CPC .... H04L 12/26; H04L 41/0803; G06F 9/5055
See application file for complete search history.

(56) References Cited

U.S. PATENT DOCUMENTS

| | | | |
|---|---|---|---|
| 7,051,030 B2 * | 5/2006 | Kitain et al. | |
| 7,194,522 B1 * | 3/2007 | Swildens et al. | 709/217 |
| 7,441,045 B2 * | 10/2008 | Skene et al. | 709/241 |
| 7,581,011 B2 * | 8/2009 | Teng | 709/229 |
| 7,802,174 B2 * | 9/2010 | Teng et al. | 715/200 |
| 2006/0080412 A1 * | 4/2006 | Oprea et al. | 709/220 |
| 2007/0038499 A1 * | 2/2007 | Margulies et al. | 705/9 |
| 2008/0294777 A1 * | 11/2008 | Karve et al. | 709/226 |
| 2009/0300184 A1 * | 12/2009 | Karve et al. | 709/226 |
| 2010/0106541 A1 * | 4/2010 | Upadhyaya et al. | 705/7 |
| 2013/0007244 A1 * | 1/2013 | Gnech et al. | 709/223 |
| 2013/0238795 A1 * | 9/2013 | Geffin et al. | 709/224 |

OTHER PUBLICATIONS

F5 Network, Inc., Configuration Guide for BIG-IP Global Traffic Manager, Version 10.1.*

* cited by examiner

Primary Examiner — Umar Cheema
Assistant Examiner — Tesfu Mekonen
(74) Attorney, Agent, or Firm — The Law Office of Austin Bonderer, PC

(57) ABSTRACT

A computer implemented method for creating and establishing one or more workflow based template for a one or more domain servers by a one or more users using a centralized application management system is provided. The one or more users include a first user and a second user. The computer implemented method includes (i) creating, at a template module, a first workflow based template for a first domain server by the first user, the first workflow based template includes one or more root node, the one or more root node includes a one or more patent nodes, (ii) sending, by the first user, the first workflow based template for validation and approval by the second user, and (iii) establishing the first workflow based template in the first domain server.

12 Claims, 28 Drawing Sheets

| | | | | | | Logged in user: admin | Logout |
|---|---|---|---|---|---|---|---|
| 302 | 304 306 | My Dashboard | View | Admin | Reporting | Templates | Alerts | User | Device | Settings | XML |

Manage Users | Manage Roles | LDAP

User List

Total No. of User(s): 110                                                                              308 — ✱ Create New User Show [12 ▼] entries                                                            Search [        ]

| ID ▲ | User ID ▲ | Password ▲ | First Name ▲ | Last Name ▲ | E-Mail ID ▲ | Role ▲ | Action |
|---|---|---|---|---|---|---|---|
| 1 | admin | ************ | Steven Finn | Smith | steve@abc.com | admin | 🗑 |
| 2 | test | ************ | Robert Kenny | Anderson | robert@bda.com | test | ✎ 🗑 |
| 3 | test 2 | *************** | Christopher | Kumar | christ@abc.com | admin | ✎ 🗑 |
| 4 | admin 1 | ************ | Prasanna | Prasath | Prasan@wed.com | admin | ✎ 🗑 |
| 5 | admin 4 | ******** | Ram Kumar | Chandran | ram@wds.com | admin | ✎ 🗑 |
| 6 | user 2 | ********* | Santhosh | Kumar Reddy | santhosh@reg.com | admin | ✎ 🗑 |
| 7 | user 5 | ********** | Sabarinathan | Chandrasekar | sabari@abn.com | test | ✎ 🗑 |
| 8 | user 7 | ********** | Mohammad | Shariff | mohammad@poj.com | test | ✎ 🗑 |
| 9 | user10 | *************** | Akim | Khan | akim@dsa.com | admin | ✎ 🗑 |
| 10 | test11 | ************** | Thoufich | Mohammad | thoufic@ghv.com | test | ✎ 🗑 |
| 11 | admin6 | ******************* | Jhonson | Mitchal | jhonson@dgc.com | admin | ✎ 🗑 |
| 12 | test6 | **************** | William | Brito | william@pjk.com | test | ✎ 🗑 |

Showing 1 to 12 of 110 entries                                         First | Previous   1 2 3 4 5 ... Next | Last

| | | | | | | Logged in user: admin  Logout |
|---|---|---|---|---|---|---|
| | My Dashboard | View | Admin | Reporting | Templates | Alerts  User  Device  Settings  XML |

402 — Device Management | Class Management

Device List

Total No. of Device(s): 110

Show [9 ▼] entries

404 — ✱ Add New Device

Search [         ]

| ID ▲ | Device Name ⇅ | IP Address ⇅ | User ID ⇅ | Password ⇅ | Device Type ⇅ | Configuration File Path ⇅ | Action |
|---|---|---|---|---|---|---|---|
| 1 | www.ltm.com | 40.3.83.25 | admin | ********** | LTM | /home/appviewx/vip.conf | ✎ 🗑 |
| 2 | www.gtm.com | 192.168.1.233 | test | *************** | GTM | /home/appviewx/wideip.conf | ✎ 🗑 |
| 3 | www.ltm.com | 40.3.83.24 | test 2 | *************** | LTM | /home/appviewx/vip.conf | ✎ 🗑 |
| 4 | www.gtm.com | 192.168.1.240 | admin 1 | ******** | GTM | /home/appviewx/wideip.conf | ✎ 🗑 |
| 5 | www.gtm.com | 192.168.2.210 | admin 4 | ********** | GTM | /home/appviewx/wideip.conf | ✎ 🗑 |
| 6 | www.gtm.com | 40.3.83.21 | user 2 | ********** | GTM | /home/appviewx/wideip.conf | ✎ 🗑 |
| 7 | www.ltm.com | 40.3.83.20 | user 5 | ********** | LTM | /home/appviewx/vip.conf | ✎ 🗑 |
| 8 | www.gtm.com | 40.3.83.65 | user 7 | ********** | GTM | /home/appviewx/wideip.conf | ✎ 🗑 |
| 9 | www.ltm.com | 192.168.1.230 | user10 | *************** | LTM | /home/appviewx/vip.conf | ✎ 🗑 |

Showing 1 to 9 of 110 entries — 406

First | Previous  1 2 3 4 5 ... Next | Last

| | | | | | | Logged in user: admin | Logout |
|---|---|---|---|---|---|---|---|
| | My Dashboard | View | Admin | Reporting | Templates | Alerts | User | Device | Settings | XML |

Heat Map | Audit Log | Custom Graph

User ID [ ] Event [ -- Select and event -- ▼ ] From Date [yyyy/mm/dd] To Date [yyyy/mm/dd] [GO]

Search [ ]

Show [13 ▼] entries

| S.No | Date | Event | Description |
|---|---|---|---|
| 1 | 2013/01/04 02:53:22 | User login | User 'admin' logged in |
| 2 | 2013/01/04 03:21:51 | User login | User 'admin' logged in |
| 3 | 2013/01/07 03:22:32 | User login | User 'admin' logged in |
| 4 | 2013/01/07 12:11:37 | User login | User 'admin' logged in |
| 5 | 2013/01/07 12:20:54 | User login | User 'admin' logged in |
| 6 | 2013/01/07 12:24:02 | User login | User 'admin' logged in |
| 7 | 2013/01/07 13:03:43 | User login | User 'admin' logged in |
| 8 | 2013/01/08 09:59:18 | User login | User 'admin' logged in |
| 9 | 2013/01/08 11:28:58 | User login | User 'admin' logged in |
| 10 | 2013/01/11 07:14:32 | User login | User 'admin' logged in |
| 11 | 2013/01/11 08:25:09 | User login | User 'admin' logged in |
| 12 | 2013/01/12 05:19:00 | User login | User 'admin' logged in |
| 13 | 2013/01/12 09:27:22 | User login | User 'admin' logged in |

Showing 1 to 13 of 135 entries

First | Previous 1 2 3 4 5 ... Next | Last

| My Dashboard | View | Admin | Reporting | Templates | Alerts | User | Device | Settings |

Logged in user: admin  Logout  XML

Select Application Name [____] GO

Enter Email Address [____]

Alert Configuration

☐ Server Enable/Disable Alert
☐ Server Event UP/Down Alert

[Save Configuration]

| | Enable/Disable | Hours | | Minutes | |
|---|---|---|---|---|---|
| | | | | | |
| Device Alert | ☐ | 0 ▼ | | 0 ▼ | ▲ |
| Syslog Alert | ☑ | 0 ▼ | | 0 ▼ | ▲ |
| Syslog Listener | ☐ | | | | ▲ |
| Automatic File Downloader | ☐ | 0 ▼ | | 0 ▼ | ▲ |
| Run File Parser Now | ☐ | | | | ▲ |
| Data Collection | ☐ | 0 ▼ | | 0 ▼ | ▲ |
| SQLite Backup | ☑ | 0 ▼ | | Select ▼ | ▲ |
| | | ○ Weekly | | Select ▼ | |
| | | ○ Monthly | | 1 ▼ | |
| | | No. of Month's data to retain | | | |

| AppViewX Servers | License Key | | |
|---|---|---|---|

AppViewX Server Instances

| AppViewX Server Instance | Unique Objects Managed | | Action |
|---|---|---|---|
| Available Servers for Activation: 0 Activated Servers: 2 | Total Objects Managed: 20000 | | |
| 192.168.1.42:8090<br>Production Server | 15000 | | ⊘ |
| 192.168.1.41:8090<br>Production Server | 500 | | ⊘ |

FIG. 11

Enter WideIP/Virtual Server Name [         ] GO ← 1202  ← 1204

Wide IPs (53)

| Wide IP Status | No. of Connections |
|---|---|
| ⊞ ● Wide IP1 | ≋ 250 |
| ⊞ ● Wide IP ⊘ | ≋ 156 |
| ⊞ ● Wide IP3 | ≋ 130 |
| ⊞ ● Wide IP4 | ≋ 720 |
| ⊞ ● Wide IP5 | ≋ 563 |
| ⊞ ● Wide IP6 | ≋ 189 |
| ⊞ ● Wide IP ⊘ | ≋ 156 |
| ⊞ ● Wide IP8 | ≋ 720 |
| ⊞ ● Wide IP9 | ≋ 350 |
| ⊞ ● Wide IP10 | ≋ 425 |
| ⊞ ● Wide IP11 | ≋ 179 |
| ⊞ ● Wide IP12 | ≋ 154 |
| ⊞ ● Wide IP13 | ≋ 176 |
| ⊞ ● Wide IP4 | ≋ 198 |

Virtual Servers (20) ← 1206

| Virtual Server Status | No. of Connections |
|---|---|
| ⊞ ● Virtual Server1 | ≋ 180 |
| ⊞ ● Virtual Server2 | ≋ 156 |
| ⊞ ● Virtual Server 3 | ≋ 130 |
| ⊞ ● Virtual Serv⊘ | ≋ 450 |
| ⊞ ● Virtual Server5 | ≋ 496 |
| ⊞ ● Virtual Server6 | ≋ 542 |
| ⊞ ● Virtual Server7 | ≋ 231 |
| ⊞ ● Virtual Server8 | ≋ 145 |
| ⊞ ● Virtual Serv⊘ | ≋ 350 |
| ⊞ ● Virtual Server10 | ≋ 425 |
| ⊞ ● Virtual Serv⊘ 1 | ≋ 156 |
| ⊞ ● Virtual Server12 | ≋ 179 |
| ⊞ ● Virtual Server13 | ≋ 245 |
| ⊞ ● Virtual Server14 | ≋ 340 |

Logged in user: admin | Logout

My Dashboard | View | Admin | Reporting | Templates | Alerts | User | Device | Settings | XML

FIG. 12B

SYSTEM AND METHOD FOR CREATING AND ESTABLISHING A WORKFLOW BASED TEMPLATE FOR A DOMAIN SERVER OR IP SERVER IN DATACENTERS

BACKGROUND

1. Technical Field

The embodiments herein generally relate a centralized application management system, and more particularly, to a system and method for monitoring, reporting, control analytics and traffic management for individual networking components on a consolidated platform across data centers.

2. Description of the Related Art

Application delivery and device management in networks is critical for application owners and network administrators. Existing legacy tools are not supported by development teams, as there are multiple different tools with each of them running on independent scripts. Collaboration among the tools is essential for the efficient functioning of the system. Existing applications are also independent of each another with access restricted to concerned independent teams. Thus, an unreasonable amount of time and resources are spent on writing scripts every time a team needs to monitor applications outside its scope of access. Also there is no single-view visibility of an application across networking components running across multiple data centers.

Device level operations on management tools makes routing traffic amongst data centers difficult and unnecessarily complex. This also amplifies the risk of errors and difficulties in setting up and altering rules to serve traffic. Monitoring applications, studying statistics and gauging the health of applications is highly complex in existing systems. An increased number of independent tools render migration/upgrading of network tools almost impossible. Also, fixing issues consumes time, which is very critical in industries like banking, healthcare, etc., where data management is critical.

The most common solutions for application delivery and device management are provided by device vendors themselves. However, these solutions monitor the devices and give a device-centric view of the network, which does not meet the requirements of application owners, network administrators, and CXOs to monitor network components.

Accordingly, there is a need for a centralized dashboard system to monitor the applications for specific network components.

SUMMARY

In view of the foregoing, an embodiment herein provides a computer implemented method for creating and establishing one or more workflow based template for a one or more domain servers by a one or more users using a centralized application management system. The one or more users include a first user and a second user. The computer implemented method includes (i) creating, at a template module, a first workflow based template for a first domain server by the first user, the first workflow based template includes one or more root node, the one or more root node includes a one or more parent nodes, (ii) sending, by the first user, the first workflow based template for validation and approval by the second user, and (iii) establishing the first workflow based template in the first domain server. Each of the one or more parent nodes includes (a) a pool node that defines properties of a one or more pools, the one or more pools includes a first pool and a second pool, the first pool and the second pool include a one or more pool members, and (b) a iRule node that defines an iRule for the one or more pool, the iRule node includes a first iRule and a second iRule, the first iRule and the second iRule define the first pool and the second pool. In one embodiment, the one or more workflow based template includes a Wide IP (WIP) template and a Virtual IP (VIP) template. The iRule node further defines an iRule for the one or more pool members. The properties of each of the one or more pool members are defined by the one or more users. The properties include a persistence, a last resort pool, and/or a persistence TTL.

In one aspect, a system for creating and establishing one or more workflow based template for one or more domain servers by one or more users is provided. The one or more users include a first user and a second user. The system includes (i) a memory unit that stores a database and a set of modules, (ii) a display unit, and (iii) a processor that executes the set of modules. The set of modules includes a template module that is configured to create a first workflow based template for a first domain server by the first user, the first workflow based template includes one or more root node, the one or more root node includes a one or more parent nodes, each of the plurality parent nodes includes (a) a pool node that defines properties of a one or more pools, the one or more pools includes a first pool and a second pool, the first pool and the second pool include a one or more pool members, and (b) a iRule node that defines an iRule for the one or more pool, the iRule node includes a first iRule and a second iRule, the first iRule and the second iRule define the first pool and the second pool, the first workflow based template is send to the second user for validation and approval by the first user. In one embodiment, the first workflow based template is established in the first domain server. The one or more workflow based template includes a Wide IP (WIP) template and a Virtual IP (VIP) template. The iRule node further defines an iRule for the one or more pool members.

In another aspect, a non-transitory program storage device readable by computer, and includes a program of instructions executable by the computer to perform a method for creating and establishing one or more workflow based template for a one or more domain servers by a one or more users using a centralized application management system is provided. The one or more users include a first user and a second user. The method includes (i) creating, at a template module, a first workflow based template for a first domain server by the first user, the first workflow based template includes one or more root node, the one or more root node includes a one or more parent nodes, each of the plurality parent nodes includes (a) a pool node that defines properties of a one or more pools, the one or more pools includes a first pool and a second pool, the first pool and the second pool include a one or more pool members, and (b) a iRule node that defines an iRule for the one or more pool, the iRule node includes a first iRule and a second iRule, the first iRule and the second iRule define the first pool and the second pool, (ii) sending, by the first user, the first workflow based template for validation and approval by the second user, and (iii) establishing the first workflow based template in the first domain server. The one or more workflow based template includes a Wide IP (WIP) template and a Virtual IP (VIP) template. The iRule node further defines an iRule for the one or more pool members.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 3 illustrates a user interface view of a user management module of the centralized application management system of FIG. 1 according to an embodiment herein;

FIG. 4A illustrates a user interface view of a device management tab of a device management module of the centralized application management system of FIG. 1 according to an embodiment herein;

FIG. 5C illustrates a user interface view of the widget configuration module of the centralized application management system of FIG. 1 when the one or more users clicks a traffic grid widget in the widget selection area of FIG. 5A according to an embodiment herein;

Figure 7C:
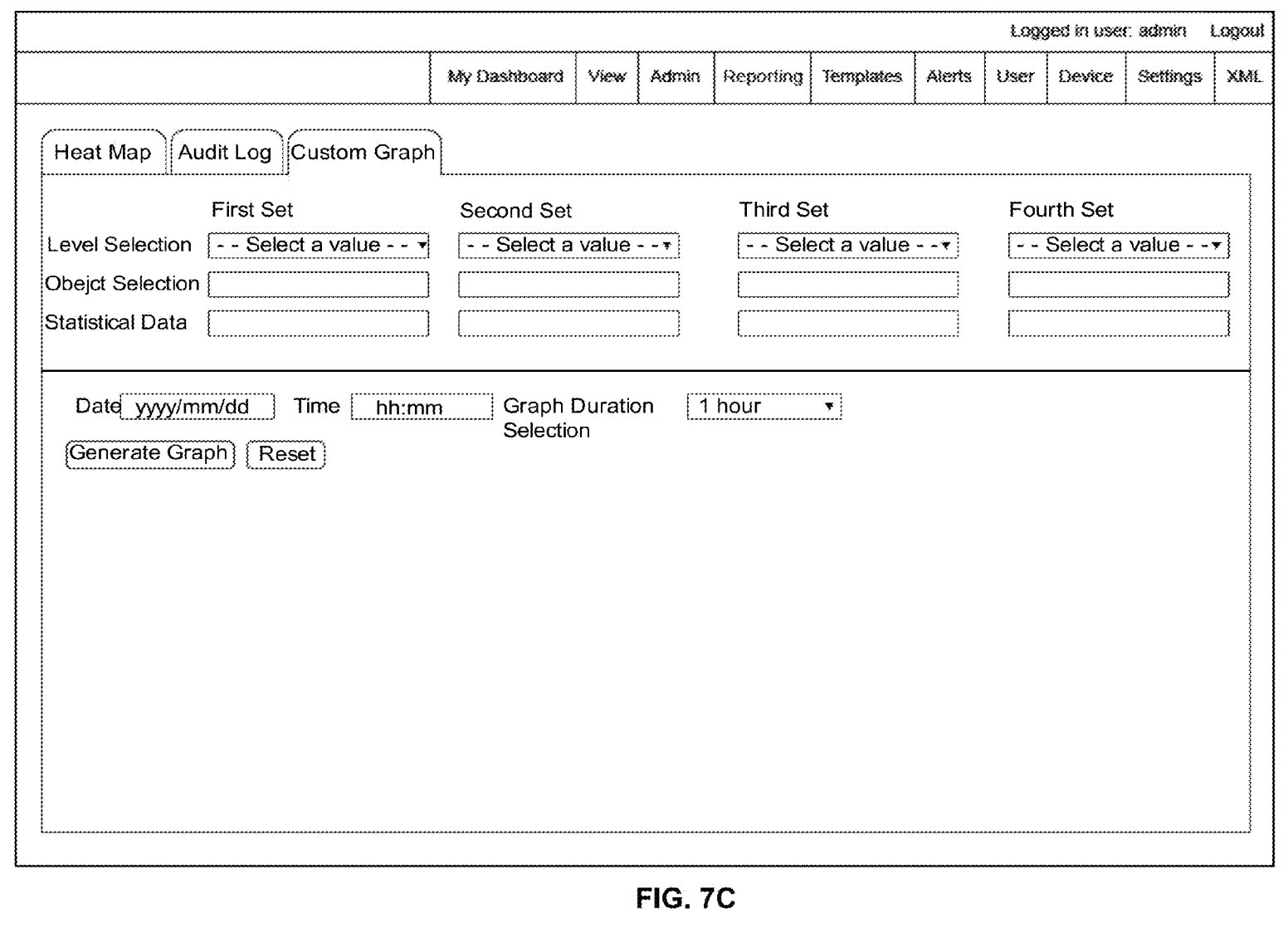

FIGS. 7A through 7D illustrate a user interface view of a report generation module of the centralized application management system of FIG. 1 to an embodiment herein;

FIG. 8 illustrates a user interface view of a alert generation module of the centralized application management system of FIG. 1 according to an embodiment herein;

FIGS. 10A and 10B illustrate a user interface view of a settings module of the centralized application management system of FIG. 1 according to an embodiment herein;

FIG. 11 illustrates a user interface view of a license manager module of the centralized application management system of FIG. 1 according to an embodiment herein;

FIG. 12B illustrates a list of wide IPs and virtual server names in the application view module of the centralized application management system of FIG. 1 according to an embodiment herein;

DETAILED DESCRIPTION OF PREFERRED EMBODIMENTS

Figure 1:
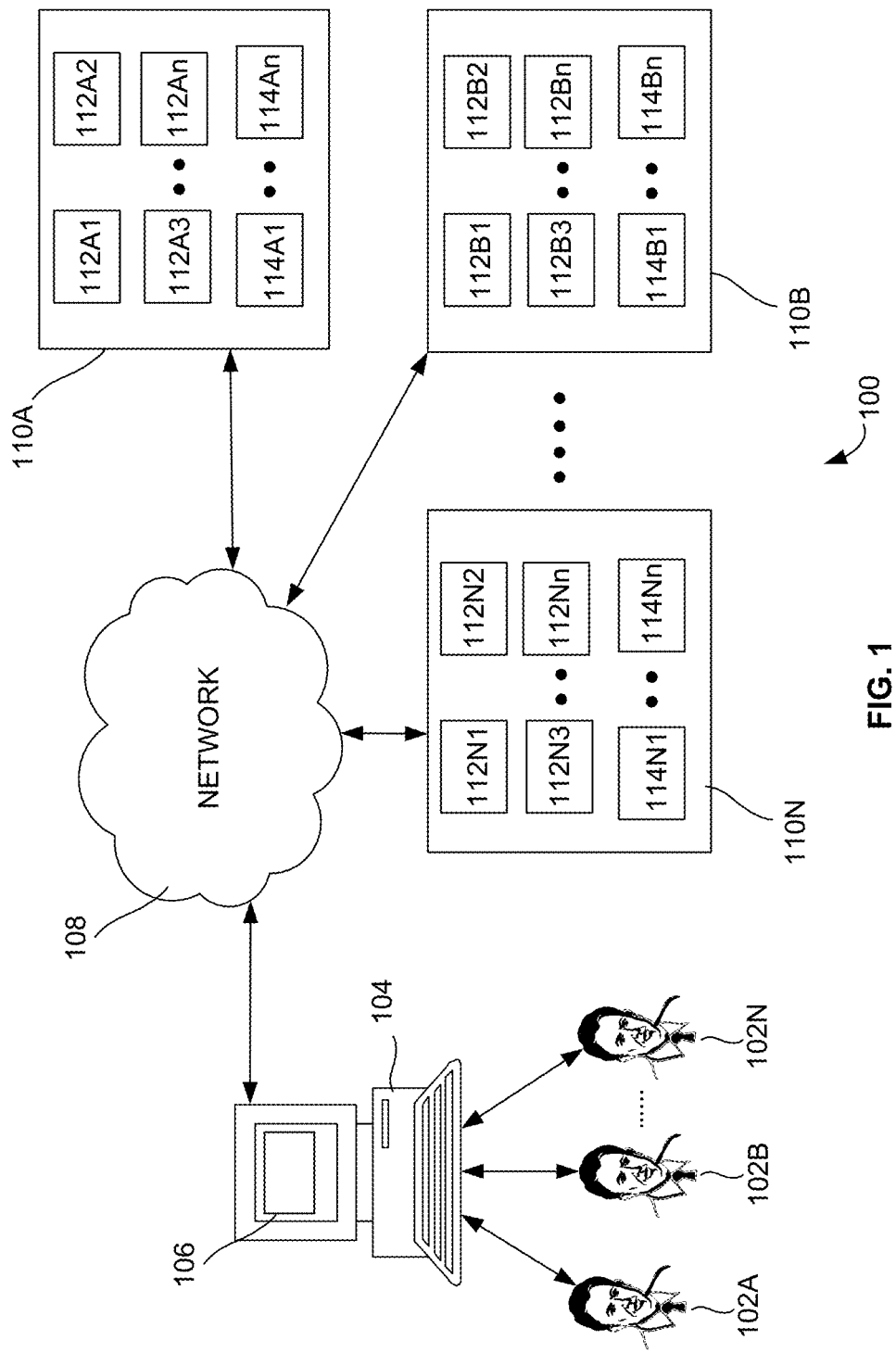
FIG. 1 illustrates a system view of one or more user communicating with a user system to monitor an application using a centralized application management system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. Referring now to the drawings, and more particularly to FIGS. 1 through FIG. 14, where similar reference characters denote corresponding features consistently throughout the figures, there are shown preferred embodiments.

FIG. 1 illustrates a system view 100 of one or more users 102A-N communicating with a user system 104 to monitor one or more Application Specific Networking Components (ASNC) 112A1-Nn operating in one or more datacenters 110A-N using a centralized application management system 106 according to an embodiment herein. The centralized application management system 106 provides a user interface to the one or more users 102A-N to monitor and control the one or more ASNC's 112A1-Nn operating in the one or more datacenters 110A-N. In one embodiment, the one or more ASNC's 112A1-Nn includes a BIG IP device from F5 networks, ACE—Application Control Engine from Cisco, and Netscaler from Citrix etc. The one or more datacenters 110A-N includes one or more IP servers 114A1-Nn. In one embodiment, the one or more IP servers 114A1-Nn also called as domain server.

Figure 2:
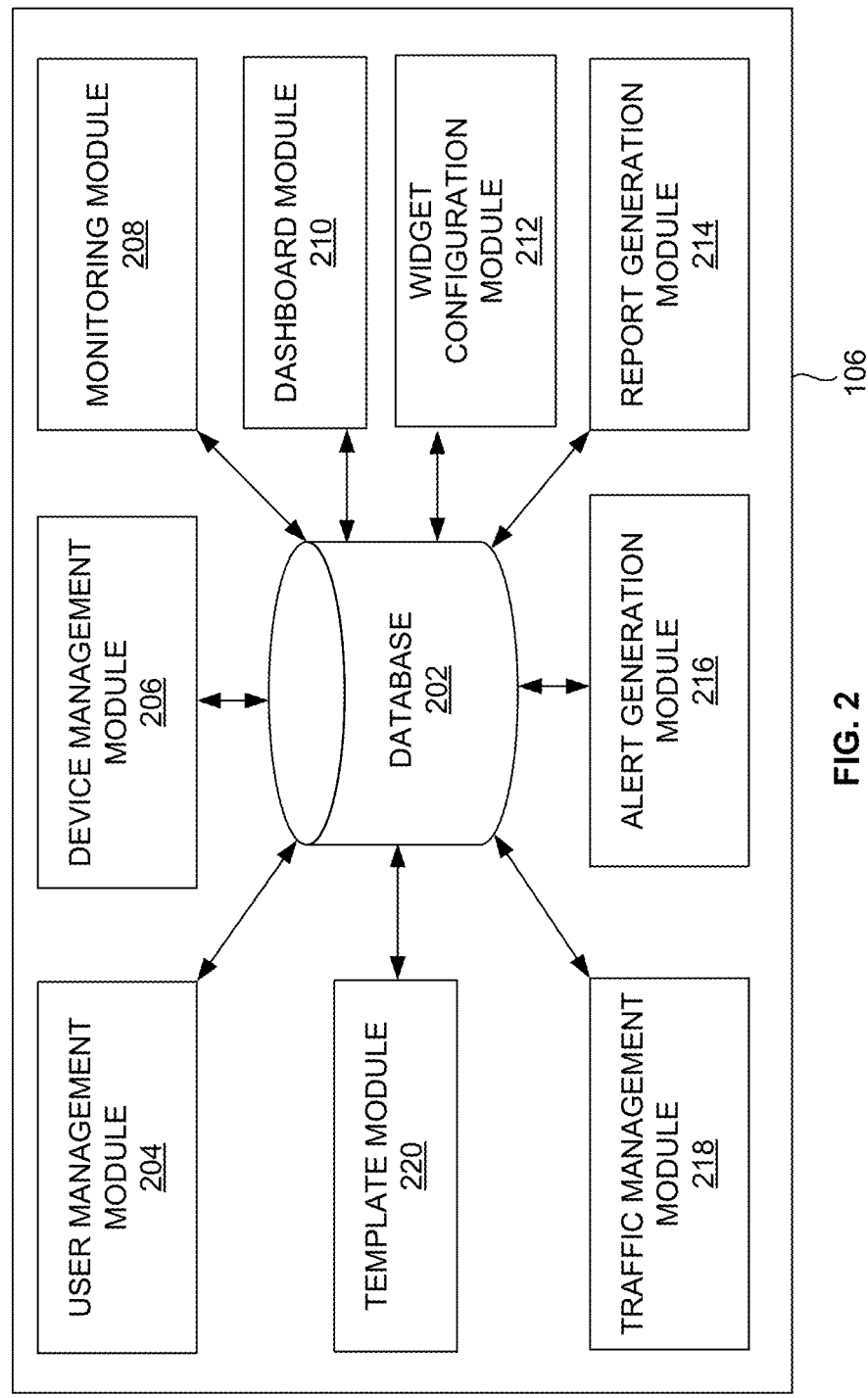
FIG. 2 illustrates an exploded view of the centralized application management system of FIG. 1 according to an embodiment herein.

FIG. 2 illustrates an exploded view of the centralized application management system 106 of FIG. 1 according to an embodiment herein. The centralized application management system 106 includes a database 202, a user management module 204, a device management module 206, a monitoring module 208, a dashboard module 210, a widget configuration module 212, a report generation module 214, an alert generation module 216, a traffic management module 218, and a template module 220.

The user management module 204 is configured to assign permission and level of access for the one or more users 102A-N. For example, the one or more users 102A-N may be given access to one or more modules of the centralized application management system 106 depending upon their granted privileges. The device management module 206 is configured to add and/or delete the one or more ASNC's 112A1-Nn to the one or more datacenters 110A-N of the centralized application management system 106 by the administrator and/or the one or more users 102A-N.

The monitoring module 208 interfaces with the one or more ASNC's 112A1-Nn connected to the centralized application management system 106 to monitor the one or more ASNC's 112A1-Nn. The monitoring module 208 further obtains a performance data from the one or more ASNC's 112A1-Nn. The performance data is obtained from various applications (such as software programs) executed on the one or more ASNC's 112A1-Nn. The performance data obtained from the one or more ASNC's 112A1-Nn are stored in the database 202. The performance data includes up-time, network identifiers such as a Basic Service Set Identification (BSSID), IP address and Location Code, a connection duration, an authentication state, an authentication method, number of packets received, number of packets received with errors, number of successfully transmitted packets, number of failed ACKs on transmitted packets, a peak and average transmit and receive throughput on a radio, number of retransmissions, number of fragmented packets, a Received Signal Strength Indicator (RSSI), number of devices on the Access Point (AP), an Extended Service Set Identification (ESSID), and packet fragmentation threshold.

The dashboard module 210 provides an interface to the one or more users 102A-N in the user system 104. The one or more users 102A-N may view, control and monitor the one or more ASNC's 112A1-Nn of the one or more datacenters 110A-N using the dashboard module 210. The widget configuration module 212 is configured to create one or more widgets for the one or more ASNC's 112A1-Nn. In one embodiment, the widget configuration module 212 allows a first user 102A to configure a first widget of the first ASNC 112A1 in the first data center 110A. The first widget may define a malfunction performance data and/or one or more rules. The one or more rules include instructions (i) to enable or disable the first ASNC 112A when the malfunction performance data is detected in the performance data received from the first ASNC 112A, (ii) generate a graphical representation for the first ASNC 112A.

The report generation module 214 generates one or more graphical representation of the one or more ASNC's 112A1-Nn based on the performance data obtained in the monitoring module 208. In one embodiment, a first group of users may access the widget configuration module 212 to configure and/or modify the one or more widget. In another embodiment, a second group of users may access only the report generation module 214 to generate and view the one or more graphical representation of the one or more ASNC's 112A1-Nn. Some users may be allowed to access the one or more modules of the centralized application management system 106.

The alert generation module 216 generates an alert message for the one or more ASNC's 112A1-Nn based on the one or more rules defined in the one or more widgets. The traffic management module 218 manages a traffic level of the one or more datacenters 110A-N and displays the traffic level in the personalized dashboard. The traffic management module 218 further configures the one or more ASNC's 112A1-Nn at the one or more datacenters 110A-N when the one or more users 102A-N modify the traffic level in the interface. The template module 220 is configured to create, restore and/or migrate to one or more templates. The template module 220 further allows the one or more users 102A-N to share the one or more templates with other users and modify the one or more templates through the centralized application management system 106. In one embodiment, the centralized application management system 106 may further include a setting module (not shown in FIG.), a license manager module (not shown in FIG.) and an application view module (not shown in FIG.). The settings module allows the one or more users 102A-N to configure alert parameters (e.g. e-mail, etc.) for services or processes such as a device alert, a syslog alert, a syslog listener, a file parser, a file downloader, data collection and a backup. The license manager module provides a user interface which allows the administrator to manage one or more IP servers 114A1-Nn, monitor the one or more ASNC's 112A1-Nn which are managed across the one or more IP servers 114A1-Nn and upgrade the existing license. The application view module is a default page for the one or more users 102A-N. The one or more users 102A-N needs to enter a wideIP name or a virtual server name for which a topology is displayed according to the information available in a configuration filed.

FIG. 3 illustrates a user interface view 300 of the user management module 204 of the centralized application management system 106 of FIG. 1 according to an embodiment herein. The user interface view 300 of the user management module 204 includes a manage users tab 302, a manage roles tab 304, and a LDAP tab 306. In one embodiment, the user interface view 300 of the user management module 204 is password protected. In one embodiment, the user interface view 300 of the user management module 204 may be accessed only by the administrator. The manage user tab 302 includes a create new user button 308, and a users display field 310. The users display field 310 displays the one or more users 102A-N of the centralized application management system 106. The users display field 310 includes one or more fields such as user ID field, a password field, a first name field, a last name field, an E-mail ID field, a role field, and an action field. The create new user button 308 allows the administrator to add the one or more users 102A-N to the centralized application management system 106. The action field allows the administrator to delete the one or more users 102A-N of the centralized application management system 106.

The manage roles tab allows the administrator to assign, remove and/or modify a role for the one or more users 102A-N. The manage roles tab allows the administrator to assign a read and/or a write access of a particular role to the one or more users 102A-N.

FIG. 4A illustrates a user interface view 400A of a device management tab 402 of the device management module 206 of the centralized application management system 106 of FIG. 1 according to an embodiment herein. The user interface view 400 of the device management tab 402 includes an add new device button 404, and a device display field 406. The device display field 406 displays the one or more ASNC's 112A1-Nn of the centralized application management system 106. The device display field 406 includes one or more fields such as a device ID field, a device name field, an IP address field, a device type field and an action field. The add new device button 404 allows the administrator and/or the one or more users 102A-N to add the one or more ASNC's 112A1-Nn to the centralized application management system 106. The action field allows administrator to delete the one or more ASNC's 112A1-Nn of the centralized application management system 106.

Figure 4B:
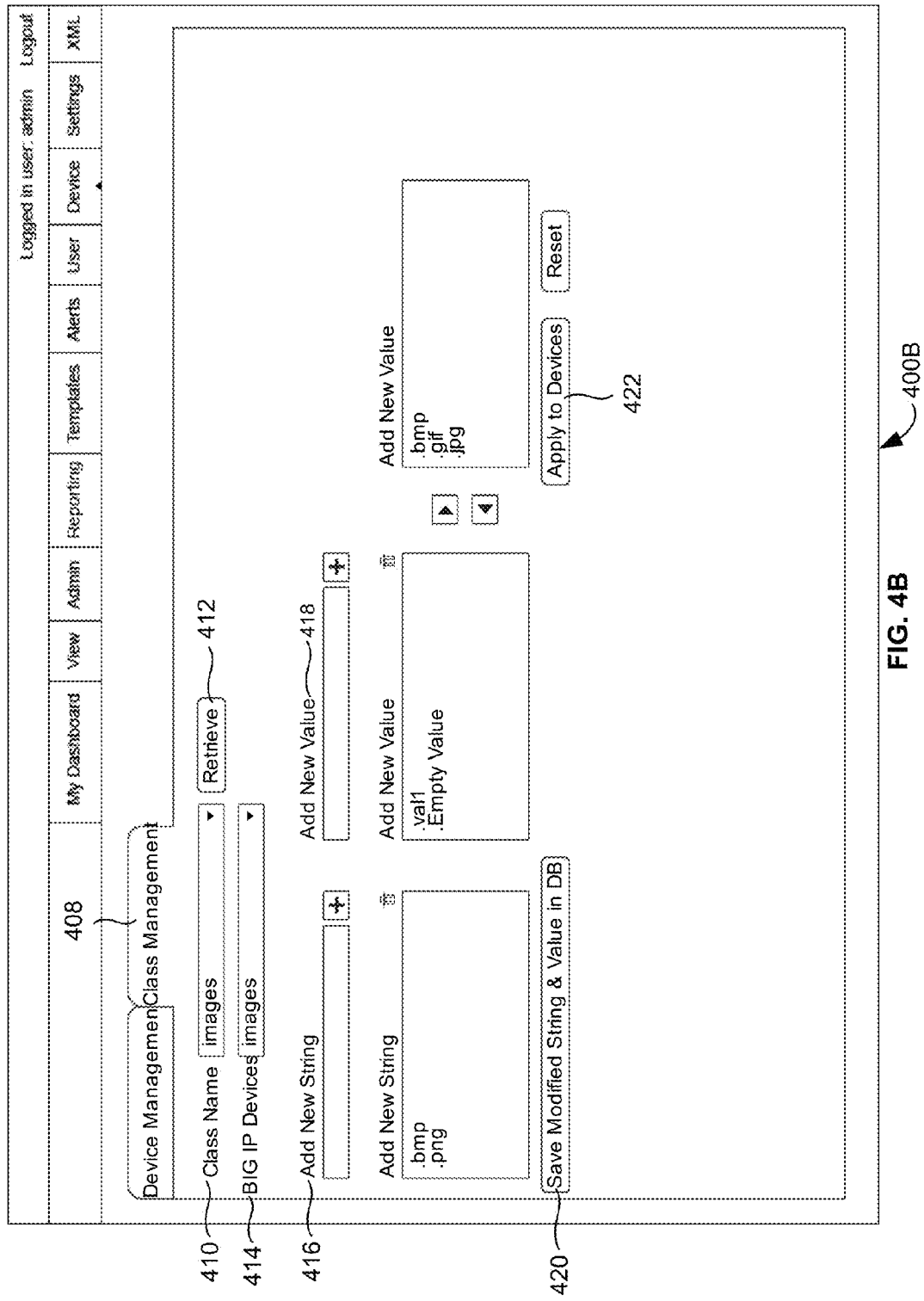
FIG. 4B illustrates a user interface view of a class management tab of the device management module of the centralized application management system of FIG. 1 according to an embodiment herein.

FIG. 4B illustrates a user interface view 400B of a class management tab 410 of the device management module 206 of the centralized application management system 106 when a BIG IP device is used as the one or more ASNC's 112A1-112Nn of FIG. 1 according to an embodiment herein. The user interface view 400B of the class management tab 408 includes a class name field 410, a retrieve button 412, a BIG IP device field 414, an add new string button 416, an add new value button 418, a save modified string and value button 420 and an apply to device button 422. The class name field 410 displays one or more classes added to the centralized application management system 106. The retrieve button 412 that retrieves a selected class from the database 202. The BIG IP device field 414 displays a list of BIG IP device added to the centralized application management system 106 for a particular class. The add new string button 416 allows the administrator and/or the one or more users 102A-N to add new strings for a particular class. The add new value button 416 allows the administrator and/or one or more users 102A-N to add new value for a particular class. The administrator and/or the one or more users 102A-N clicks on the save modified string and value button 420 to save the added strings and values in the database 202. The administrator and/or the one or more users 102A-N further clicks on the apply to device button 422 to apply the saved/modified strings and values to a particular device. The class management tab 408 manages one or more classes of the centralized application management system 106 using class names and BIG IP devices.

Figure 5A:
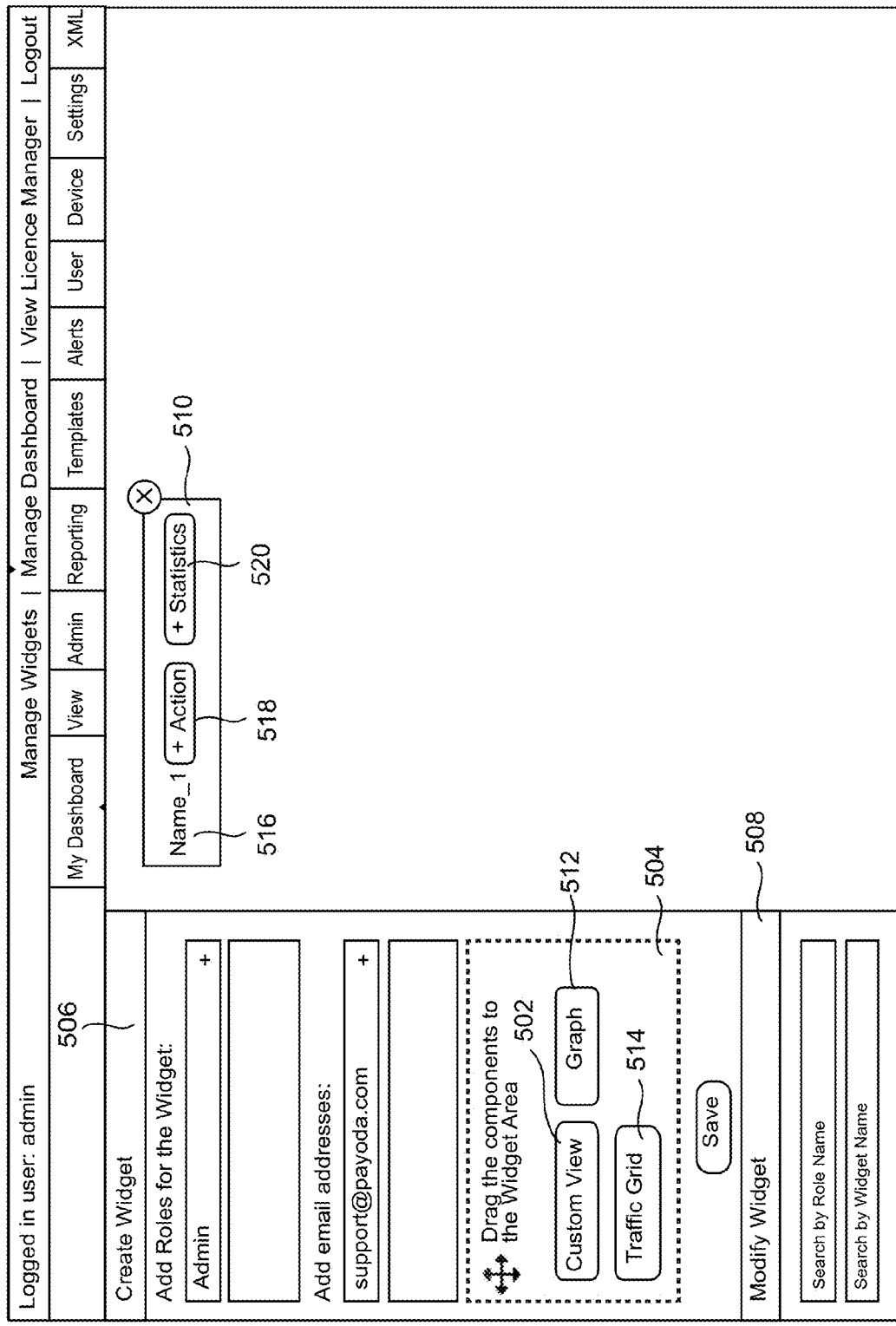
FIG. 5A illustrates a user interface view of a widget configuration module of the centralized application management system of FIG. 2 when the one or more users clicks a custom view widget in a widget selection area according to an embodiment herein.

FIG. 5A illustrates a user interface view 500A of a widget configuration module 212 of the centralized application management system 106 of FIG. 1 when the one or more users 102A-N click a custom view widget 502 in a widget selection area 504 according to an embodiment herein. The user interface view of the custom view widget includes the widget selection area 504, a create widget button 506, a modify widget button 508, and a custom view widget area 510. The widget selection area 504 provides an option to the one or more users 102A-N to view the one or more widgets in different views. The create widget button 506 allows the one or more users 102A-N to configure one or more widgets for the one or more ASNC's 112A1-Nn. The modify widget button 508 allows the one or more users 102A-N to modify the one or more widgets configured using the widget configuration module 212. The widget selection area 504 includes one or more options such as custom view widget 502, a graph widget 512, and/or a traffic grid widget 514. The custom view widget area 510 includes a name field 516, an action field 518, and a statistics field 520. The name field 516 allows the one or more users 102A-N to select a first ASNC 112A from the one or more ASNC's 112A1-Nn of the centralized application management system 106. The action field 518 allows the one or more users 102A-N to define a first rule and malfunction information for the first ASNC 112A. In one embodiment, the first rule includes sending alert to the one or more users 102A-N using the alert generation module 216, when the malfunction information is detected in the performance data received at the monitoring module 208 from the first ASNC 112A. The statistics field 520 allows the one or more users 102A-N to define a second rule. The second rule may include a method for generating a graphical representation using the report generation module 214 for the first ASNC 112A.

Figure 5B:
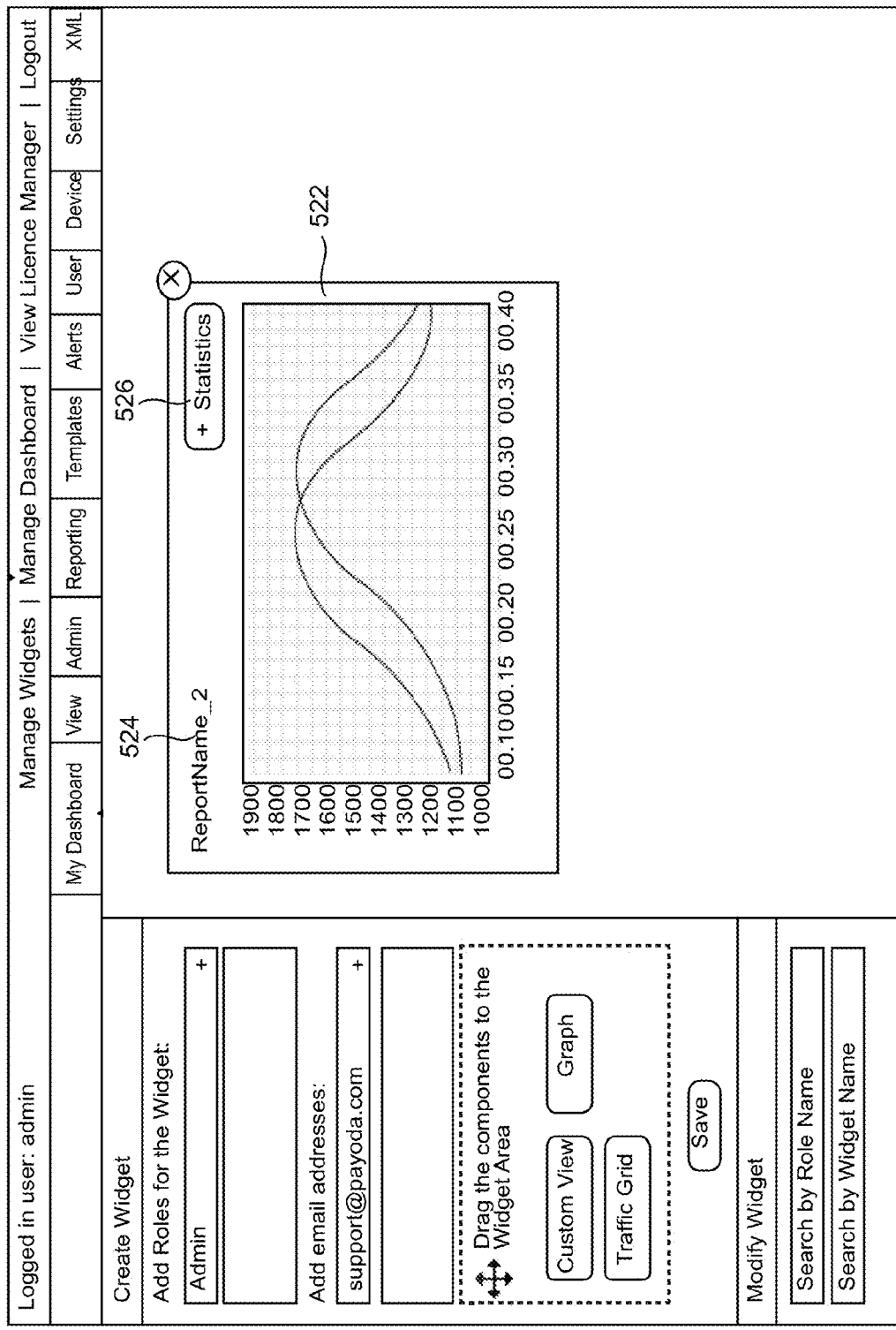
FIG. 5B illustrates a user interface view of the widget configuration module of the centralized application management system of FIG. 1 when the one or more users clicks a graph widget in the widget selection area of FIG. 5A according to an embodiment herein.

With reference to FIG. 5A, FIG. 5B illustrates a user interface view 500B of the widget configuration module 212 of the centralized application management system 106 of FIG. 1 when the one or more users 102A-N click the graph widget 512 in the widget selection area 504 according to an embodiment herein. The user interface view 500B includes a graph widget area 522 that includes a name field 524 and a statistics field 526. The name field 524 allows the one or more users 102A-N to select a first ASNC 112A from the one or more ASNC's 112A1-Nn of the centralized application management system 106. The statistics field 526 allows the one or more users 102A-N to define a second rule. The second rule may include a method for generating a graphical representation using the report generation module 214 for the first ASNC 112A.

Figure 5C:
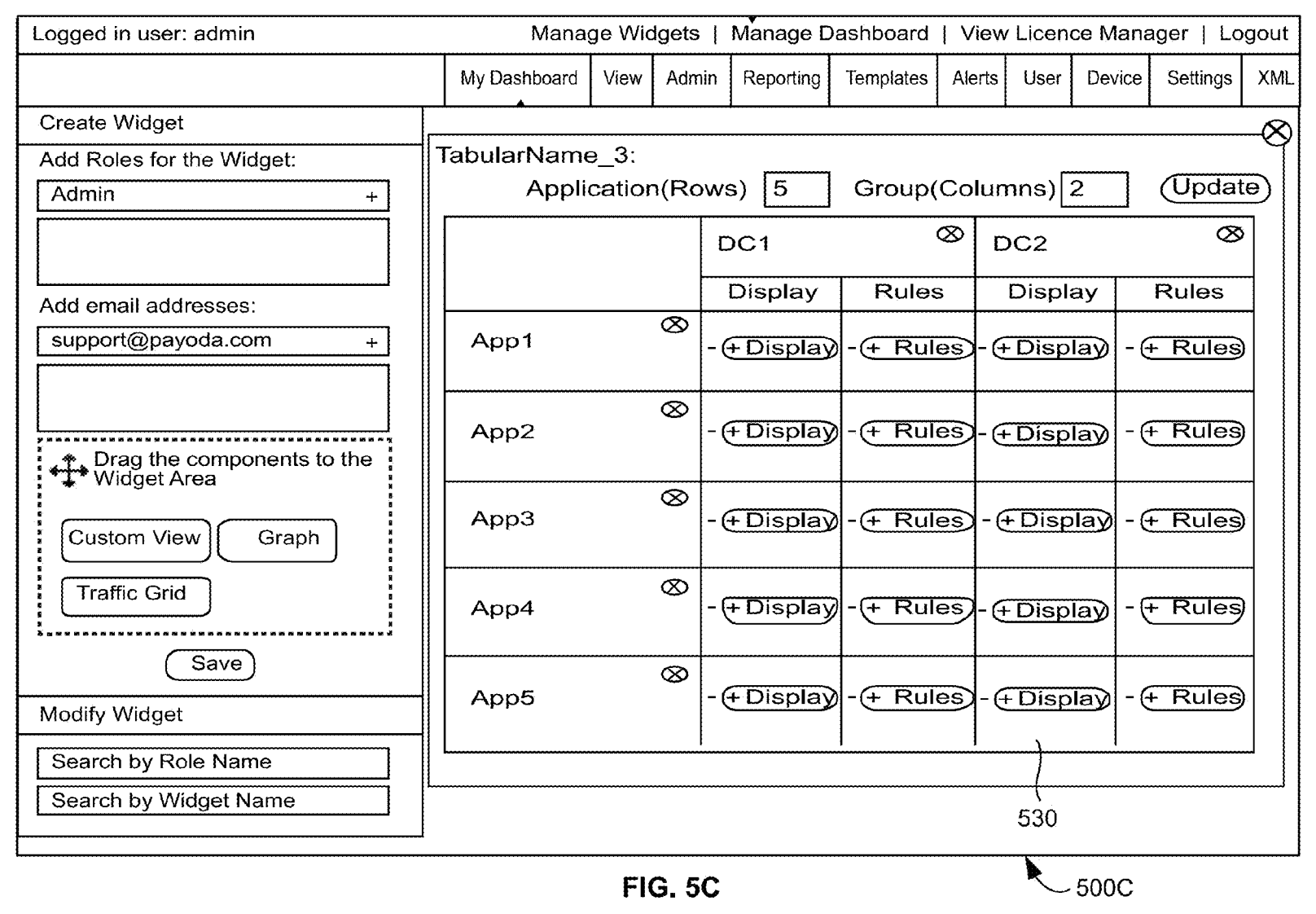

With reference to FIG. 5A, FIG. 5C illustrates a user interface view 500C of the widget configuration module 214 of the centralized application management system 106 of FIG. 1 when the one or more users 102A-N click the traffic grid widget 514 in the widget selection area 504 of FIG. 5A according to an embodiment herein. The user interface view 500C includes a traffic grid widget area 530 that displays one or more actions and/or one or more statistics specific to the one or more ASNC's 112A1-Nn. The traffic grid widget area 530 allows the administrator and/or the one or more users 102A-N to (i) check a status of the one or more ASNC's 112A1-Nn, (ii) view a traffic percentage of the one or more ASNC's 112A1-Nn, and (iii) view statistics specific to the one or more ASNC's 112A1-Nn. In one embodiment, one or more specific rules are set by the administrator and/or the one or more users 102A-N to monitor a traffic percentage variation of the one or more ASNC's 112A1-Nn.

Figure 6A:
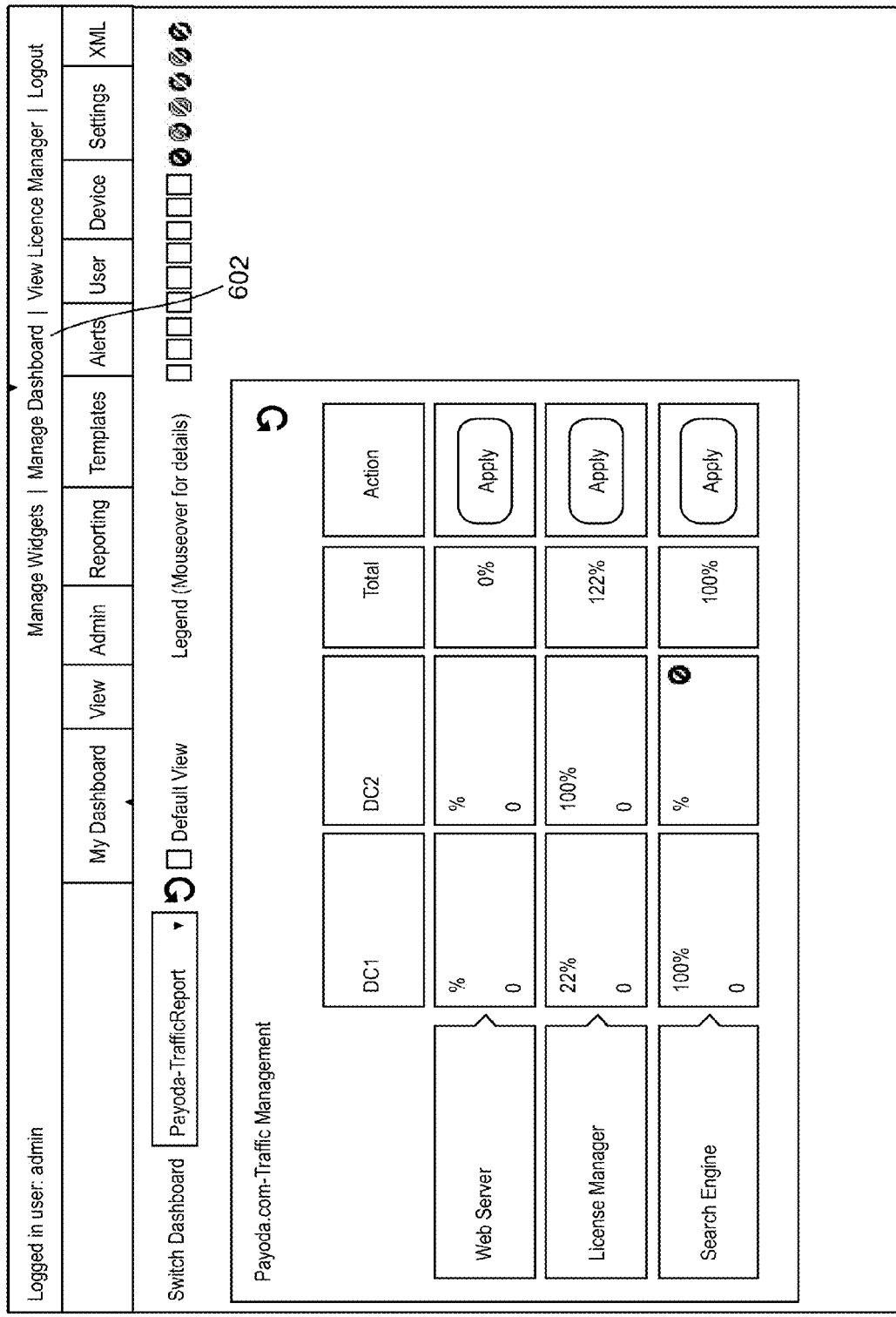
FIGS. 6A through 6C illustrate a user interface view of a manage dashboard tab of a dashboard module of the centralized application management system of FIG. 1 according to an embodiment herein.
Figure 6B:
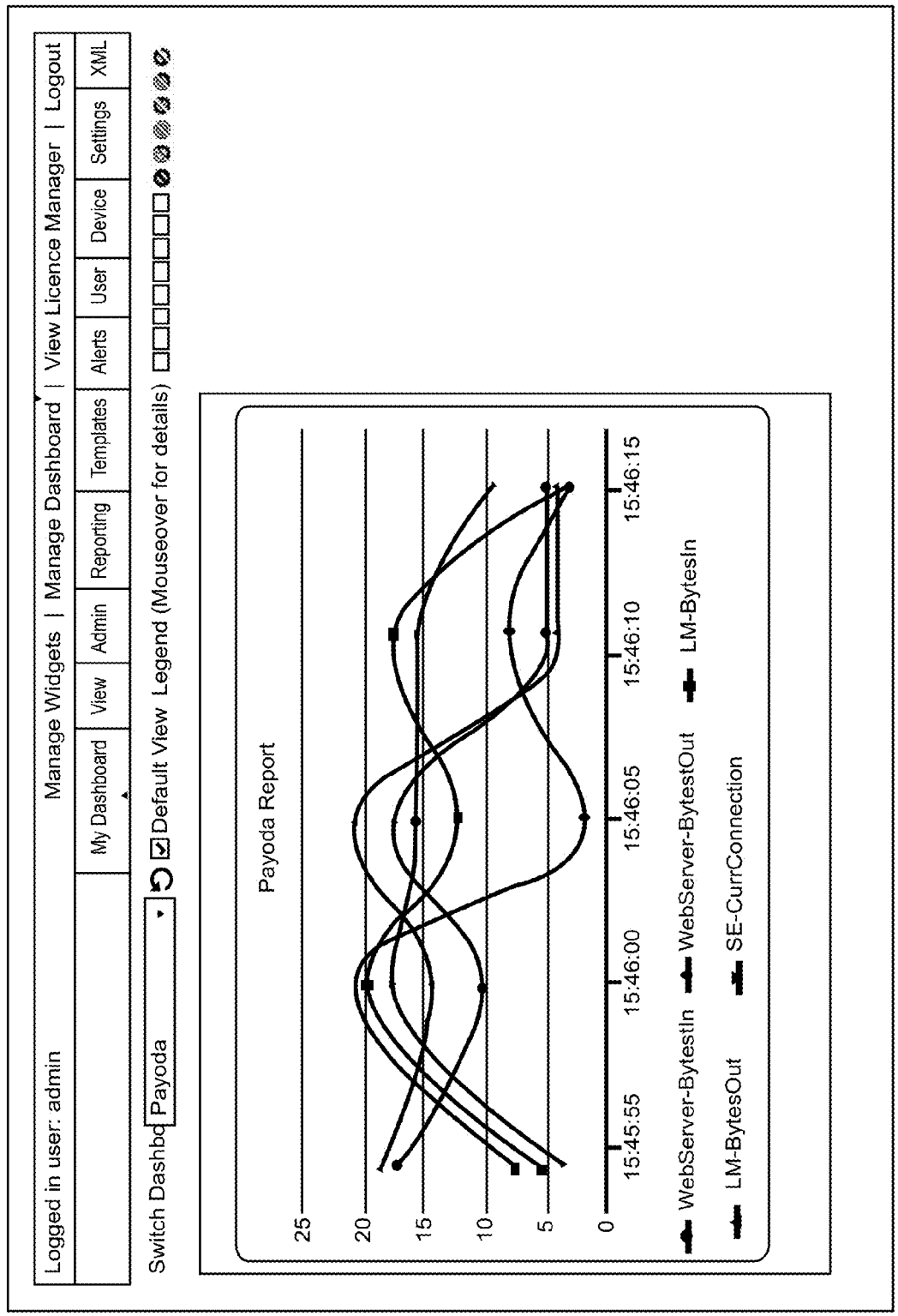
Figure 6C:
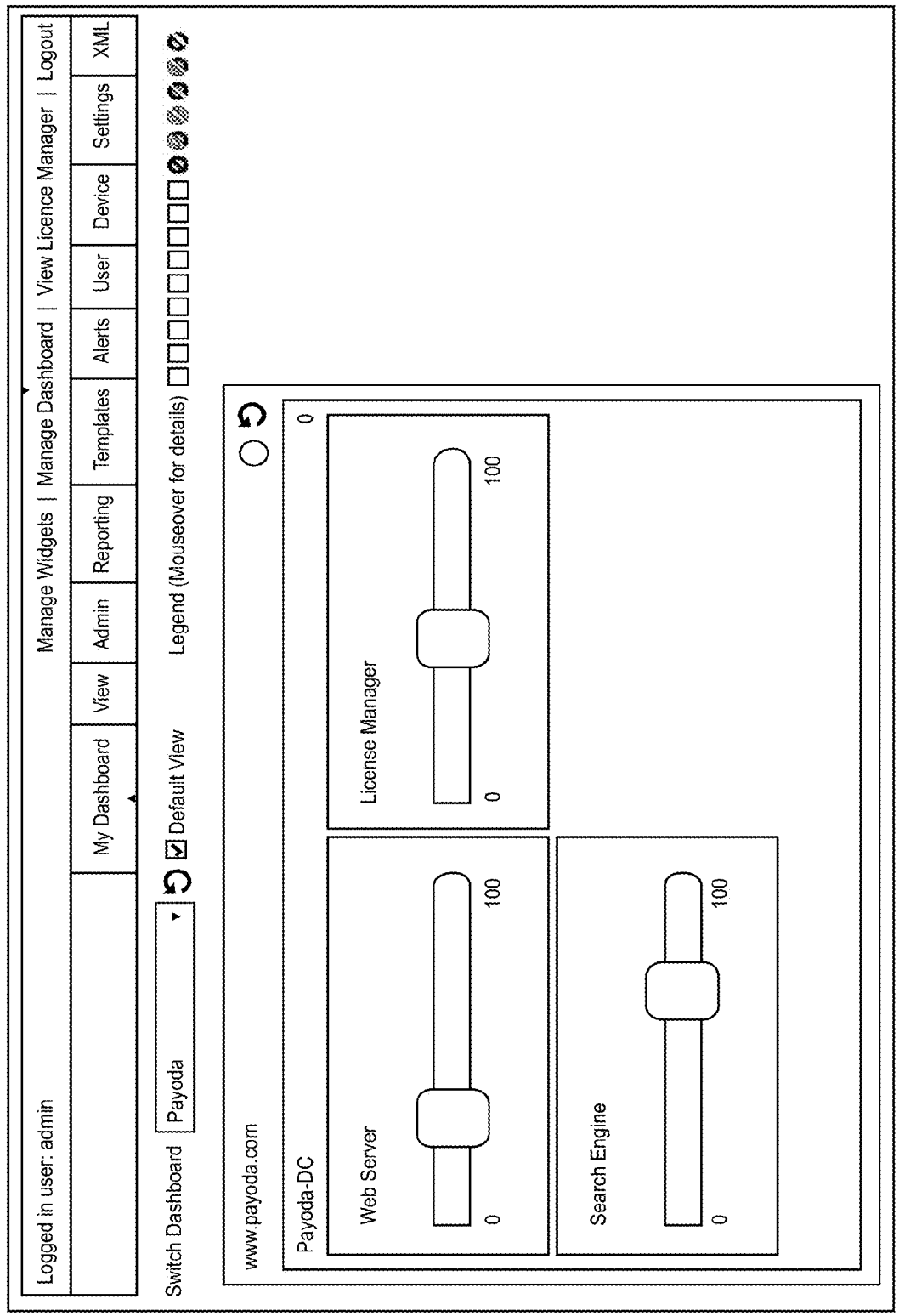
Figure 7A:
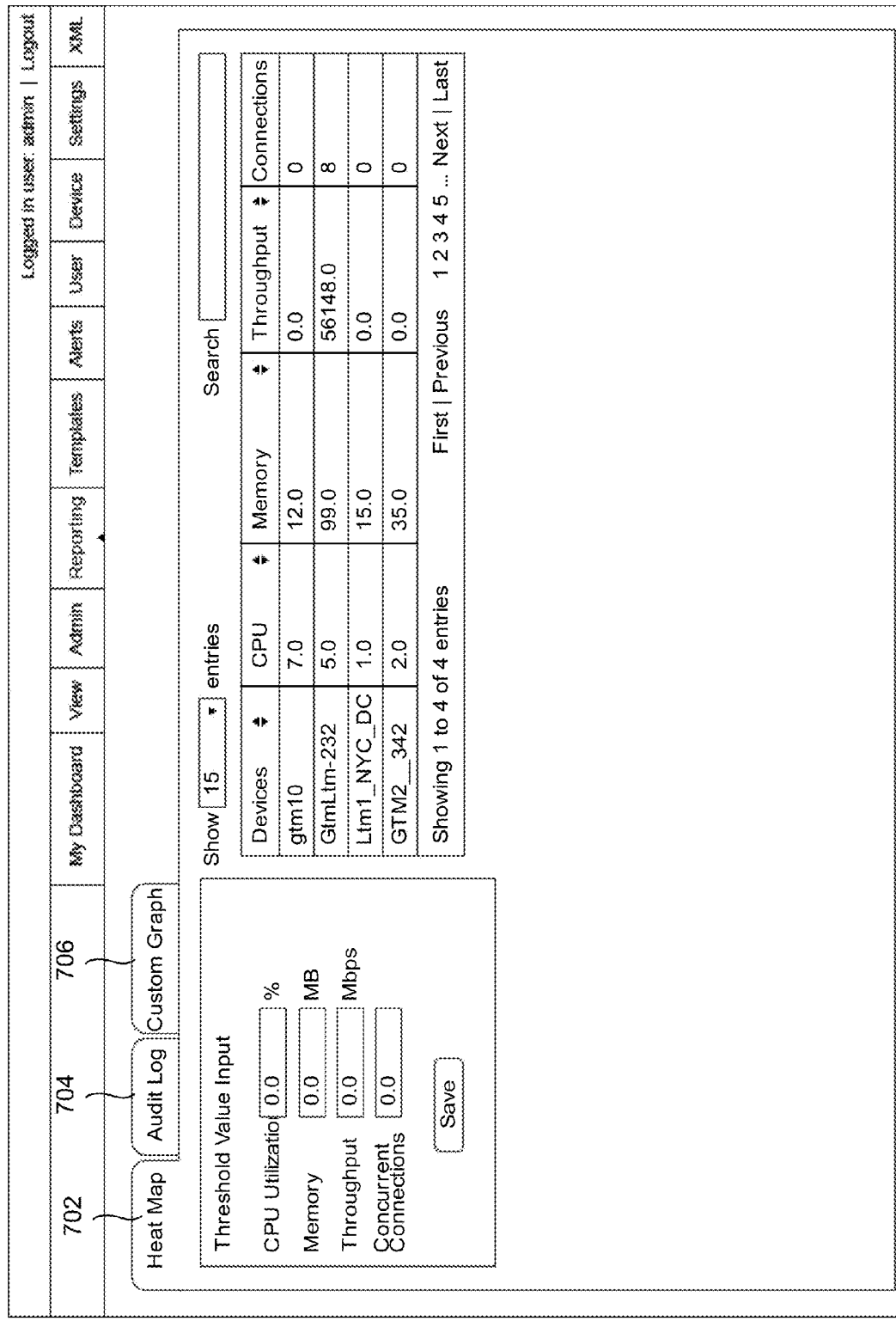
Figure 7D:
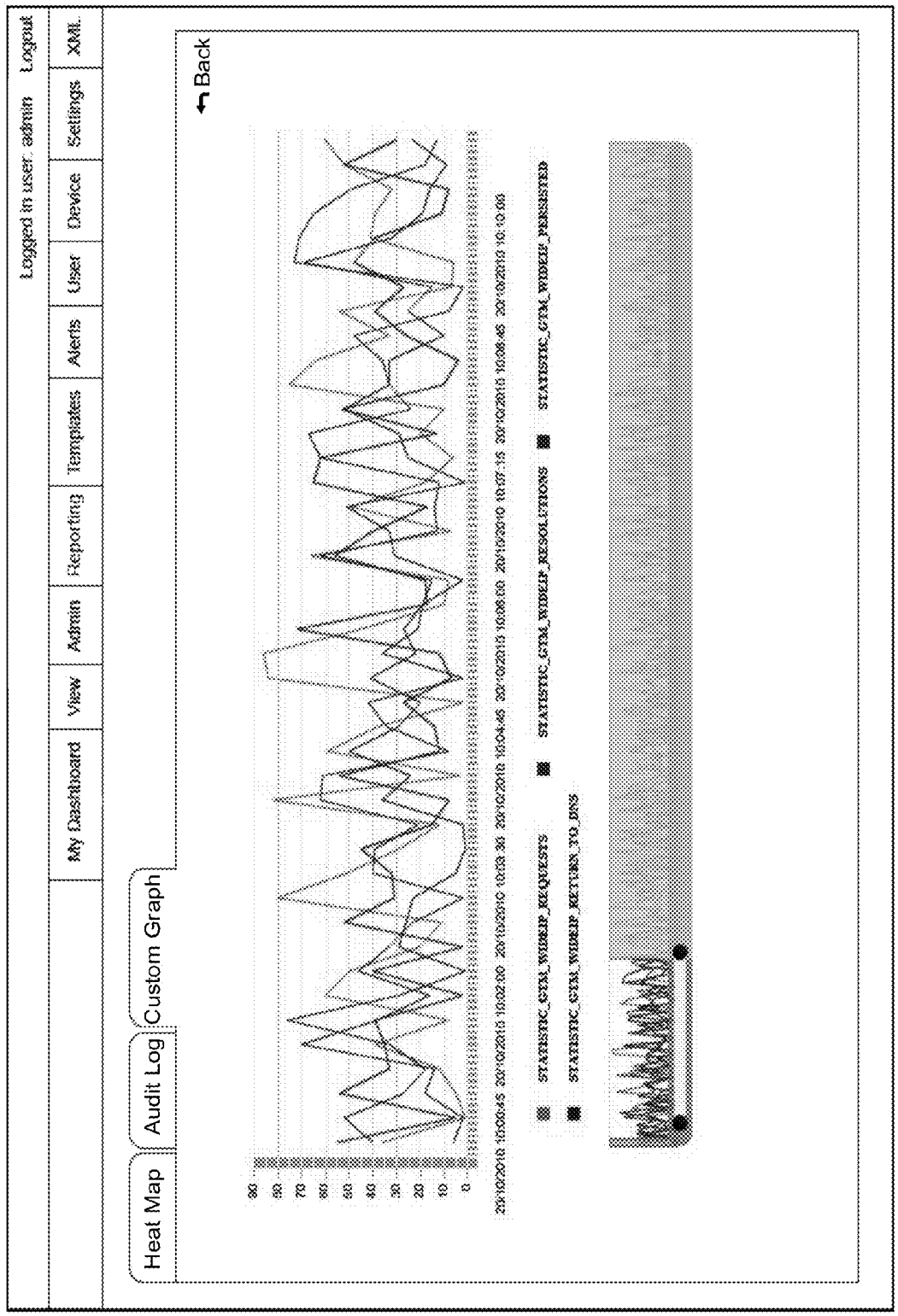

FIGS. 6A through 6C illustrate user interface views of a manage dashboard tab 602 of a dashboard module 210 of the centralized application management system 106 of FIG. 1 according to an embodiment herein. The dashboard module 210 enables the one or more users 102A-N and/or the administrator to monitor and control the one or more ASNC's 112A1-Nn across the one or more datacenters 110A-N from a single view and/or location. The user interface view 600 of the manage dashboard tab 602 includes a switch dashboard button 604 and a dashboard display field 606. The administrator and/or the one or more users 102A-N selects the one or more widgets form the switch dashboard button 604, for monitoring and controlling the one or more ASNC's 112A1-Nn and the one or more datacenters 110A-N related to the one or more widgets. In one embodiment, the dashboard display field 606 displays a traffic report widget (shown in FIG. 6A). The traffic report widget displays a traffic level managed by a first datacenter (DC1) 110A and a second datacenter (DC2) 110B. The administrator and/or the one or more users 102A-N may modify the traffic level managed by the first datacenter 110A and the second datacenter 110B to maintain the traffic level among the first datacenter 110A and the second datacenter 110B.

In another embodiment, the dashboard display field 606 displays a statistics widget (shown in FIG. 6B). The statistics widget displays a graphical representation of the performance data associated to the one or more ASNC's 112A1-112Nn configured in the statistics widget. In yet another embodiment, the dashboard display field 606 displays a slider widget (shown in FIG. 6C). The slider widget displays one or more sliders related to one or more properties (e.g. a license manager, a web server and a search engine) of the one or more datacenters 110A-N configured in the slider widget 608. The one or more sliders allows the administrator and/or the one or more users 102A-N to modify the one or more properties.

FIGS. 7A through 7D illustrate user interface views of the report generation module 214 of the centralized application management system 106 of FIG. 1 to an embodiment herein. The user interface view 700 of the report generation module 214 includes a heat map tab 702, an audit log tab 704, and a custom graph tab 706. The user interface view 700 of the report generation module 214 is visible to the one or more users 102A-N when the one or more users 102A-N is granted access to view the report generation module 214. The one or more users 102A-N configures a threshold value for specific statistical information and views the latest statistics of each one or more ASNC's 112A1-112An and/or the one or more ASNC's 112A1-Nn added in the centralized application management system 106. The heat map tab 702 represents a statistical information such as CPU utilization, a memory, a throughput and concurrent connections for which threshold values are entered by the one or more users 102A-N. The one or more users 102A-N provides a threshold value for each field and views the latest device statistics information represented in a table format.

The audit log tab 704 is used to view all the actions performed by the one or more users 102A-N of the centralized application management system 106. One or more actions performed by the one or more users 102A-N within the centralized application management system 106 are captured and stored internally within the centralized application management system 106. The administrators can view the one or more actions performed by the one or more users 102A-N on the centralized application management system 106 for audit purposes.

The custom graph tab 706 is used to view a customized graph for comparing statistical information for the one or more ASNC's 112A1-Nn of the centralized application management system 106. The custom graph tab 706 provides a comparative view of different statistical data for various elements/nodes.

FIG. 8 illustrates a user interface view 800 of the alert generation module 216 of the centralized application management system 106 of FIG. 1 according to an embodiment herein. The alert generation module 216 allows the one or more users 102A-N to configure alert parameters for the one or more ASNC's 112A1-Nn. If there are any malfunctions in the one or more ASNC's 112A1-Nn, the alert generation module 216 notifies the concerned authorities as per the alert configuration. The alert generation module 216 sends alerts to the one or more users 102A-N and/or the administrators based on (i) a syslog alert process, and (ii) a syslog listener alert. The syslog alert process is based on a centralized log file which contains all the information of the one or more ASNC's 112A1-112Nn configured in the centralized application management system 106. The syslog listener alert process functions based on messages received through a port, instead of logging the messages to a log file.

Figure 9A:
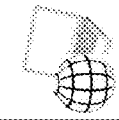
FIG. 9A illustrates a user interface view of a template module of the centralized monitoring system of FIG. 2 to an embodiment herein.

FIG. 9A illustrates a user interface view 900A of the template module 220 of the centralized monitoring system of FIG. 2 to an embodiment herein. The user interface view 900 includes a create WIP button 902, a modify WIP button 904, a create VIP button 906, a modify VIP button 908, and a template status display field 910. The template module 220 allows the one or more users 102A-N to create one or more wide IP (WIP) template and one or more virtual IP (VIP) template for one or more URL's (e.g. www.google.com, www.yahoo.com). The creation and implementation of the one or more WIP template and the one or more VIP template passes through a standard process. The standard process includes a validation and approval of the one or more WIP template and the one or more VIP template by the one or more users 102A-N. The template status display field 910 includes two tabs (i) a pending request tab 912 and (ii) a completed request tab 914. The pending request tab 912 displays the one or more WIP template and the one or more VIP template created and does not approved by one or more users 102A-N. The completed request tab 914 displays the one or more WIP template and the one or more VIP template created and approved by the one or more users 102A-N.

The one or more WIP template and the one or more VIP template illustrate a workflow based deployment of the one or more IP servers 114A1-Nn associated with the one or more datacenters 110A-N. The workflow based deployment allows a creator-approval pattern to be established where any changes created by one or more users 102A-N can go through multiple levels of approvals before the one or more WIP template and the one or more VIP template is implemented.

Figure 9B:
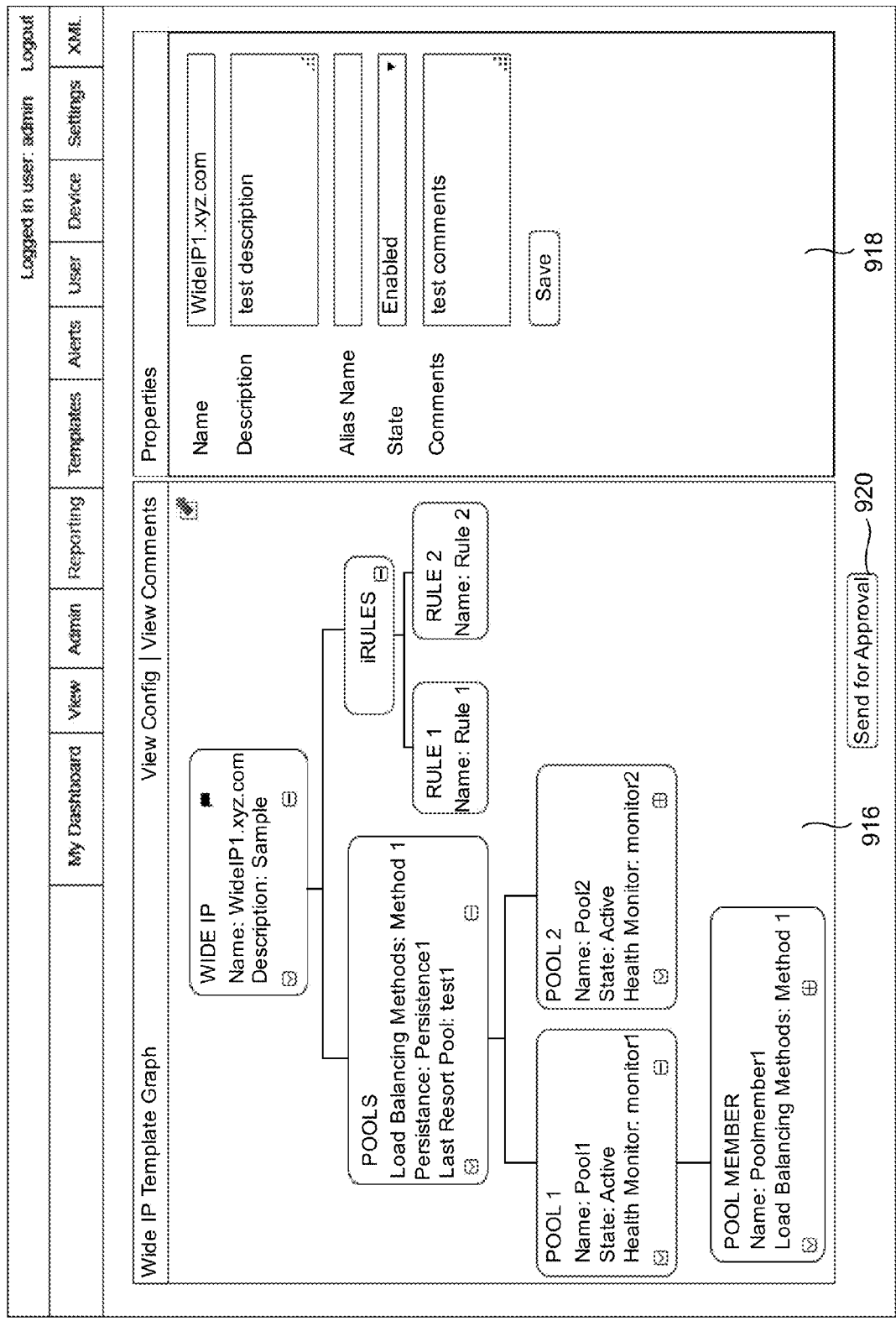
FIG. 9B illustrates a user interface view of a create WIP button of FIG. 9A according to an embodiment herein.

FIG. 9B illustrates a user interface view 900B of the create WIP button 902 of FIG. 9A according to an embodiment herein. The user interface view 900B includes a template graph generation field 916, a properties definition field 918, and a send for approval button 920. The template graph generation field 916 allows one or more users 102A-N to create the one or more WIP template using the one or more IP servers 114A1-Nn in the one or more datacenters 110A-N. For example, a first WIP template is generated of the template graph generation field 916. The first WIP template includes a parent node that includes a name and a description for the first WIP template. The parent node consists of two nodes such as (i) a pool node and (ii) a iRule node. The pool node defines properties of one or more pools. In one embodiment, the properties include such as a load balancing method, a persistence, a last resort pool, and/or a persistence TTL (Time To Live), etc. The iRule node defines an iRule for the one or more IP servers 114A1-Nn of the first WIP template. The iRule is an Event Driven scripting language. The Event Driven scripting language is a code which is written based on a specific Events that occur within the context of the connections being passed through a first WIP created using first WIP template. The pool node includes the one or more pools. Each of the one or more pools include one or more pool members and the properties such as name, a state (e.g., active/deactivate) and a health monitor (e.g., monitor 1/monitor 2) for the one or more pool member which is defined using the properties definition field 918. The one or more pool members are selected from the one or more IP servers 114A1-Nn of the one or more datacenters 110A-N.

Figure 9C:
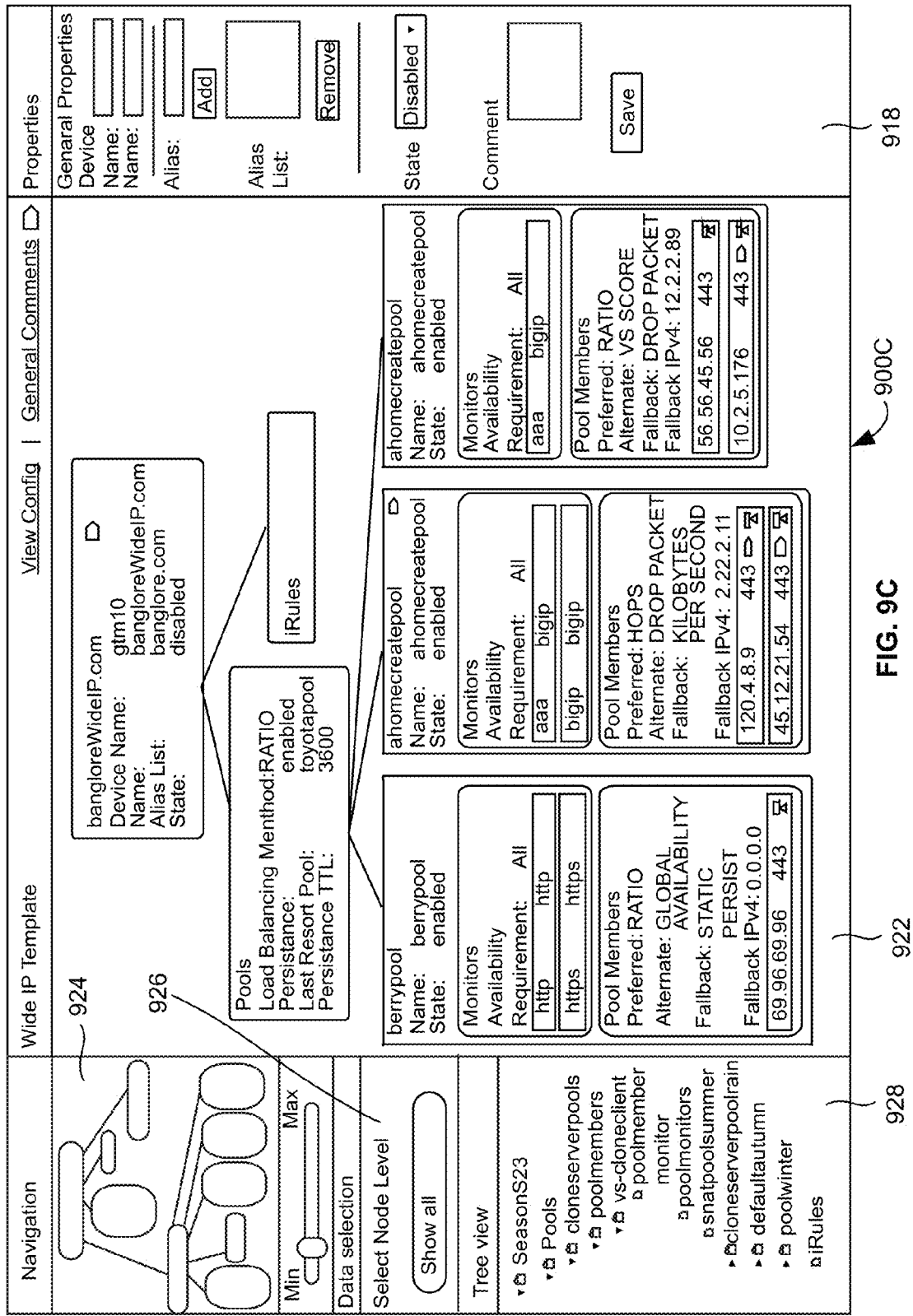
FIG. 9C illustrates a user interface view of a create VIP button of FIG. 9A according to an embodiment herein.

FIG. 9C illustrates a user interface view 900C of the create VIP button of FIG. 9A according to an embodiment herein. The user interface view 900C includes the properties definition field 918, a template graph generation field 922, a navigation field 924, a data selection field 926 and a tree view field 928. The template graph generation field 922 allows user to create the one or more VIP template using the one or more IP servers 114A1-Nn of the one or more datacenters 110A-N. The navigation field 924 generates a graphical representation of the one or more VIP template generated in the template graph generation field 922. The data selection field 926 allows the one more users 102A-N to select a node of the one or more VIP template. The tree view field 928 displays a tree view of the one or more VIP template generated in the template graph generation field 922. For example, a first VIP template is generated in the template graph generation field 922. The first VIP template includes a parent node that includes a name and a description for the first VIP template. The parent node consists of two nodes such as (i) a pool node and (ii) a iRule node. The pool node defines properties of the one or more pools. The properties include such as a load balancing method, a persistence, a last resort pool, a persistence TTL, etc. The iRule node defines an iRule for the one or more IP servers 114A1-Nn of the first VIP template. The iRule is an Event Driven scripting language. The Event Driven scripting language is a code which is written based on a specific Events that occur within the context of the connections being passed through a first VIP created using the first VIP template. The pool node includes the one or more pools. Each of the one or more pools include a one or more pool members and the properties such as a name, a state (e.g., active/deactivate) and a health monitor (e.g., monitor 1/monitor 2) for the one or more pool members is defined using the properties definition field 918. The one or more pool members is selected from the one or more IP servers 114A1-Nn of the one or more datacenters 110A-N.

Figure 10B:
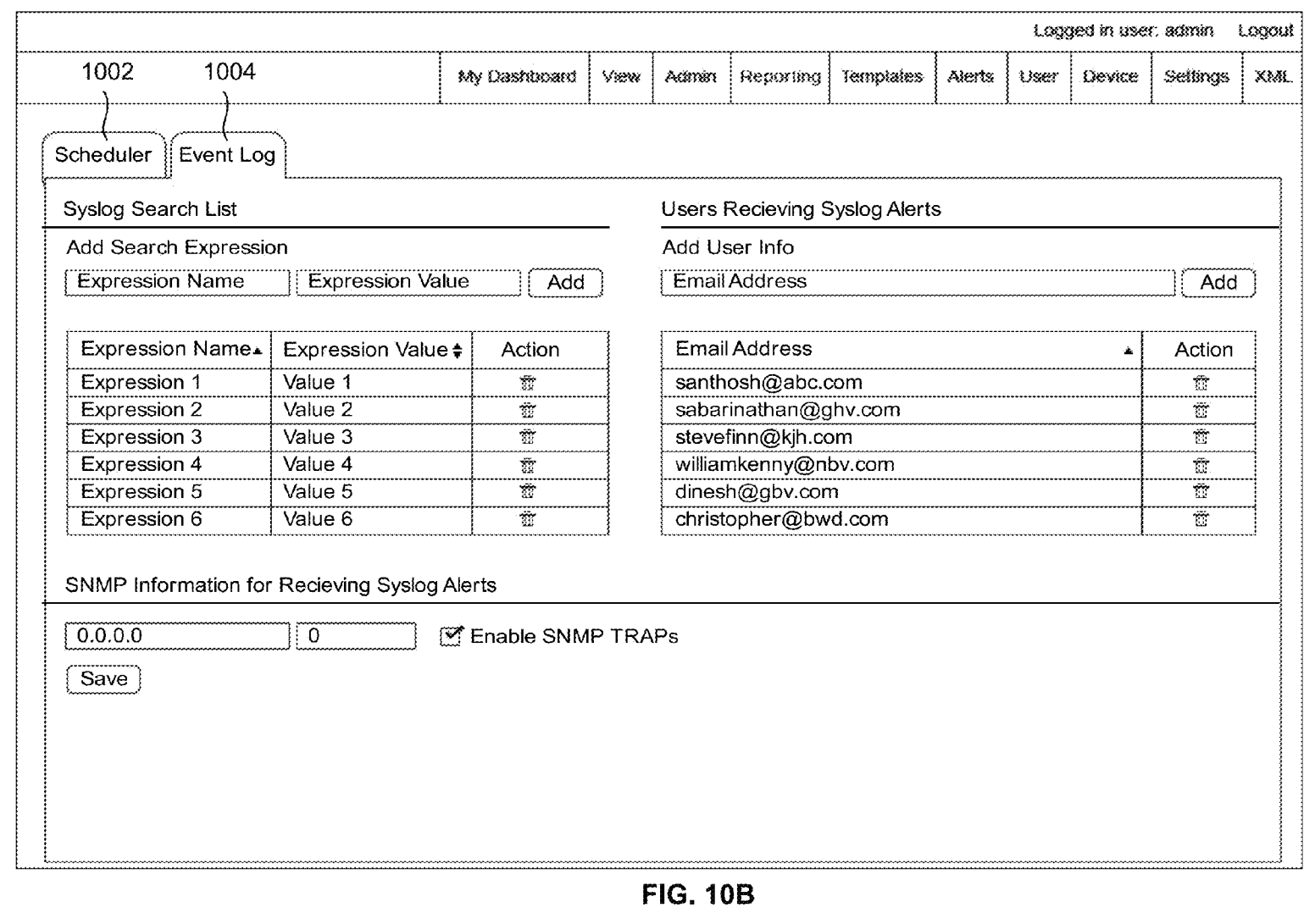

FIGS. 10A and 10B illustrate a user interface view of the settings module of the centralized application management system 106 of FIG. 1 according to an embodiment herein. The user interface view of the settings module includes a scheduler tab 1002 and an event log tab 1004. The scheduler tab 1002 has the facility to start or stop external services or processes such as a device alert, a syslog alert, a syslog listener, a file parser, a file downloader, a data collection and a backup. The event log tab 1004 configures alert parameters for the syslog alert process and the syslog listener alert process. The syslog alert process and the syslog listener alert process use a pattern/regular expression for matching values and alert e-mail, which is sent to e-mail ids configured in the settings module of the centralized application management system 106.

FIG. 11 illustrates a user interface view 1100 of the license manager module of the centralized application management system 106 of FIG. 1 according to an embodiment herein. The license manager module is a centralized tool for managing the one or more IP servers 114A1-Nn that host the centralized application management system 106 across the enterprise. The license manager module has the user interface 1100 which allows the administrators to manage the one or more servers, monitor the one or more ASNC's 112A1-Nn which are managed across the one or more IP servers 114A1-Nn and upgrade the existing license.

Figure 12A:
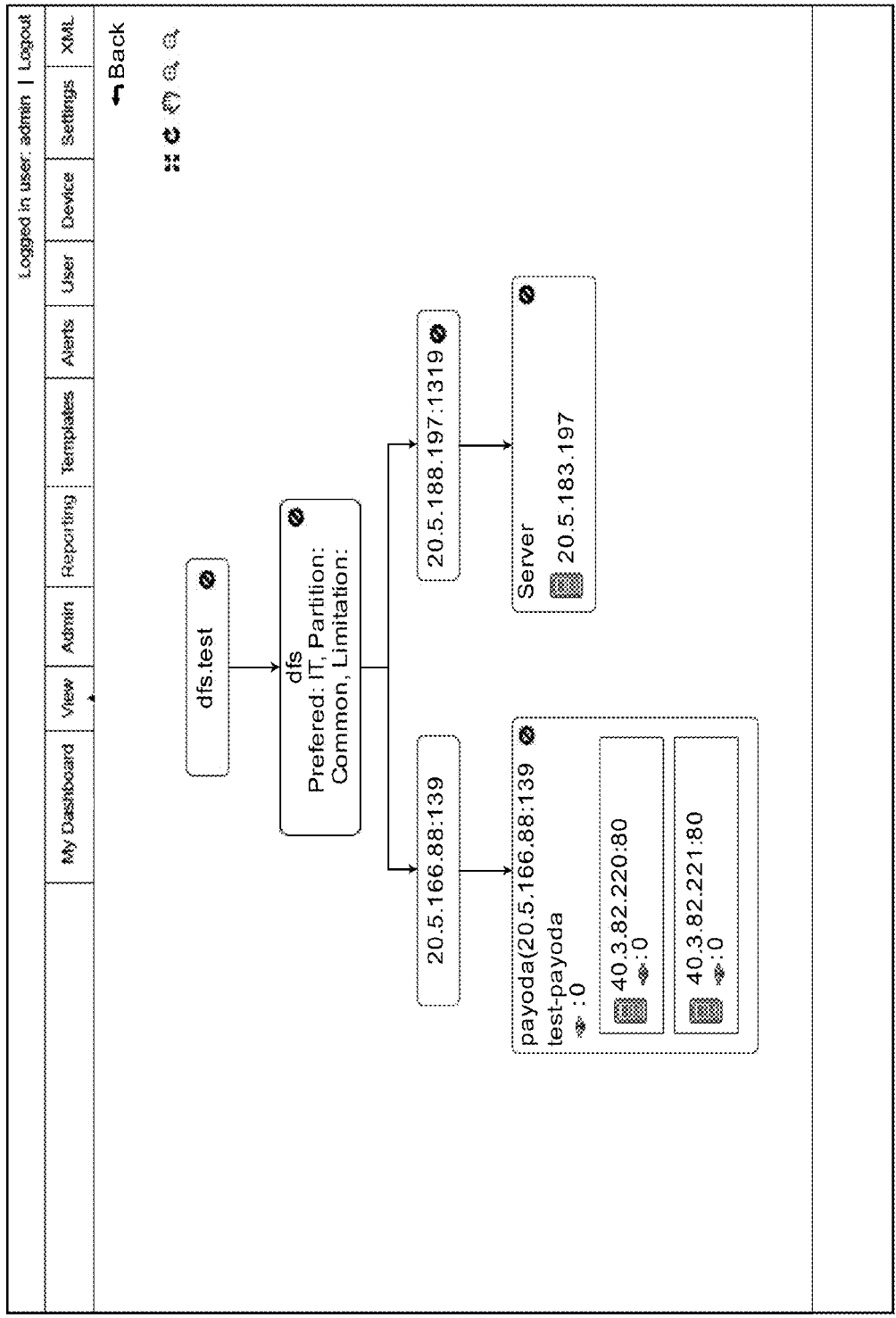
FIG. 12A illustrates a user interface view of an application view module of the centralized application management system of FIG. 1 according to an embodiment herein.

FIG. 12A illustrates a user interface view 1200 of the application view module of the centralized application management system 106 of FIG. 1 according to an embodiment herein. The user interface view 1200 of the application view module is a default page for the one or more users 102A-N. The one or more users 102A-N needs to enter a wide IP name or a virtual IP name for which a topology is displayed according to the information available in a configuration file, which is added through the device management module 206 of the centralized application management system 106.

In the topology, each element is represented as a node. The topology is displayed with a color code and a status for each node. The color code indicates an availability status and a server status which indicates the enabled or disabled status. The color code and server status information are obtained from the database 202 or a BIG-IP device, which is a configurable parameter within the centralized application management system 106.

FIG. 12B illustrates a list of wide IPs and virtual server names in the application view module of the centralized application management system 106 of FIG. 1 according to an embodiment herein. It includes a search tab 1202, a wide IP tab 1204, and a virtual server tab 1206. The search tab 1202 is provided to enter a wide IP or a virtual server name. The wideIP tab 1204 shows a status of list of available wide IPs and their number of connections. Similarly, the virtual server tab 1206 shows a status of list of available virtual server and their number of connections.

Figure 12C:
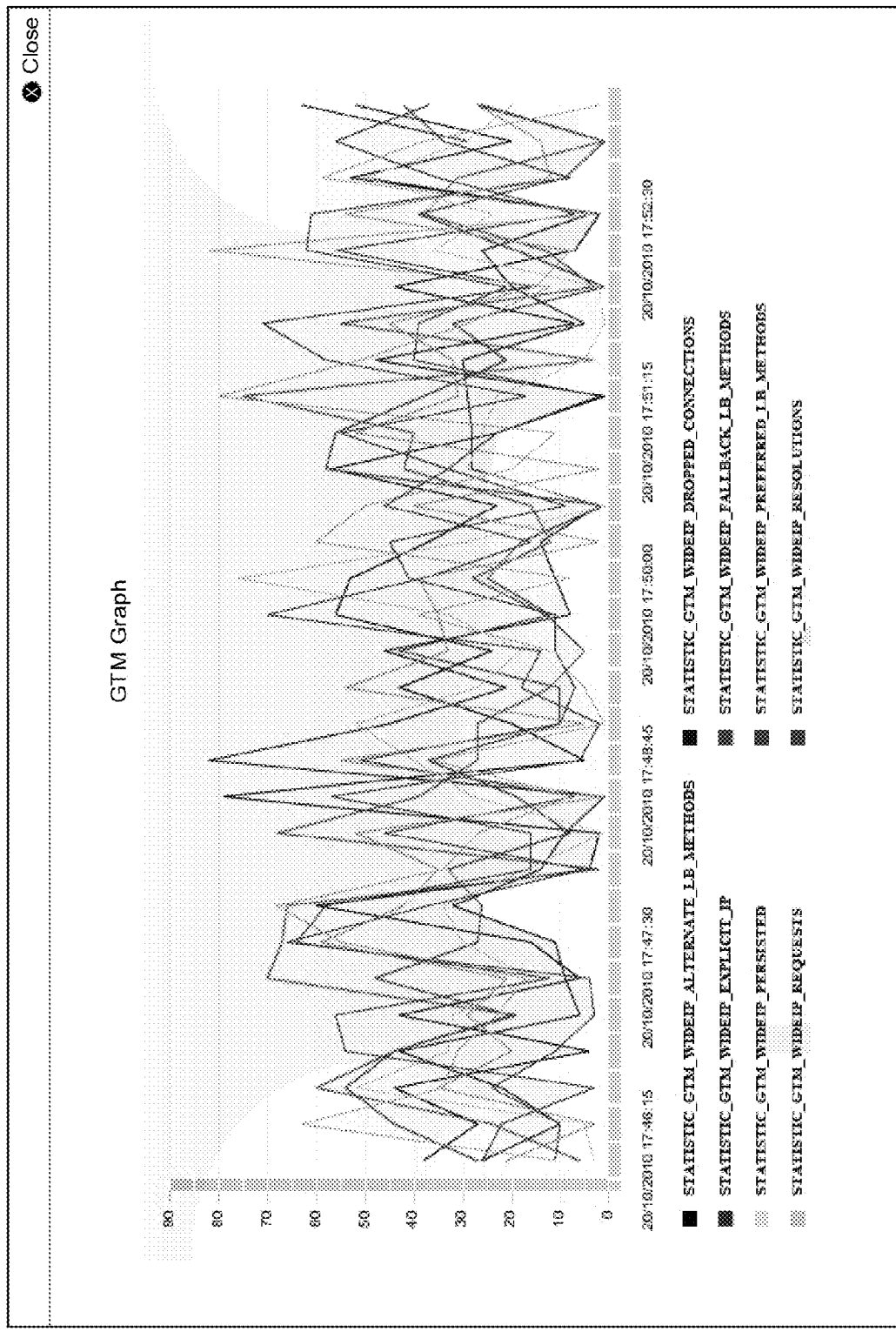
FIG. 12C illustrates a graphical representation of statistical information of eight wideIP nodes of the centralized application management system of FIG. 1 according to an embodiment herein.

FIG. 12C illustrates a graphical representation 1210 of statistical information of eight wideIP nodes of the centralized application management system 106 of FIG. 1 according to an embodiment herein. In one embodiment, the eight wideIp nodes include FALLBACK_LB_METHODS, PERSISTED, PREFERRED_LB_METHOD, REQUESTS, RESOLUTIONS, ALTERNATE_LB_METHOD, DROPPED_CONNECTIONS and EXPLICIT_IP. Statistical information corresponding to the selected node is displayed when a graph option is selected for the selected node. The statistical information is used to generate the graph which is obtained from the corresponding database file.

The graph displayed for the selected nodes is an interactive graph where the one or more users 102A-N finds the statistical information by just rolling over the graph using a pointer. The one or more users 102A-N uses a timeline to view the graph data with deep clarity. The timeline can be expanded or collapsed and scrolled to view the graph data at all the timelines. The graph displays the values for all the statistical information from a BIG-IP device. It is not mandatory that all the statistical information would be displayed. It varies depending upon the BIG-IP device configuration and the processing capability of that particular node.

Figure 12D:
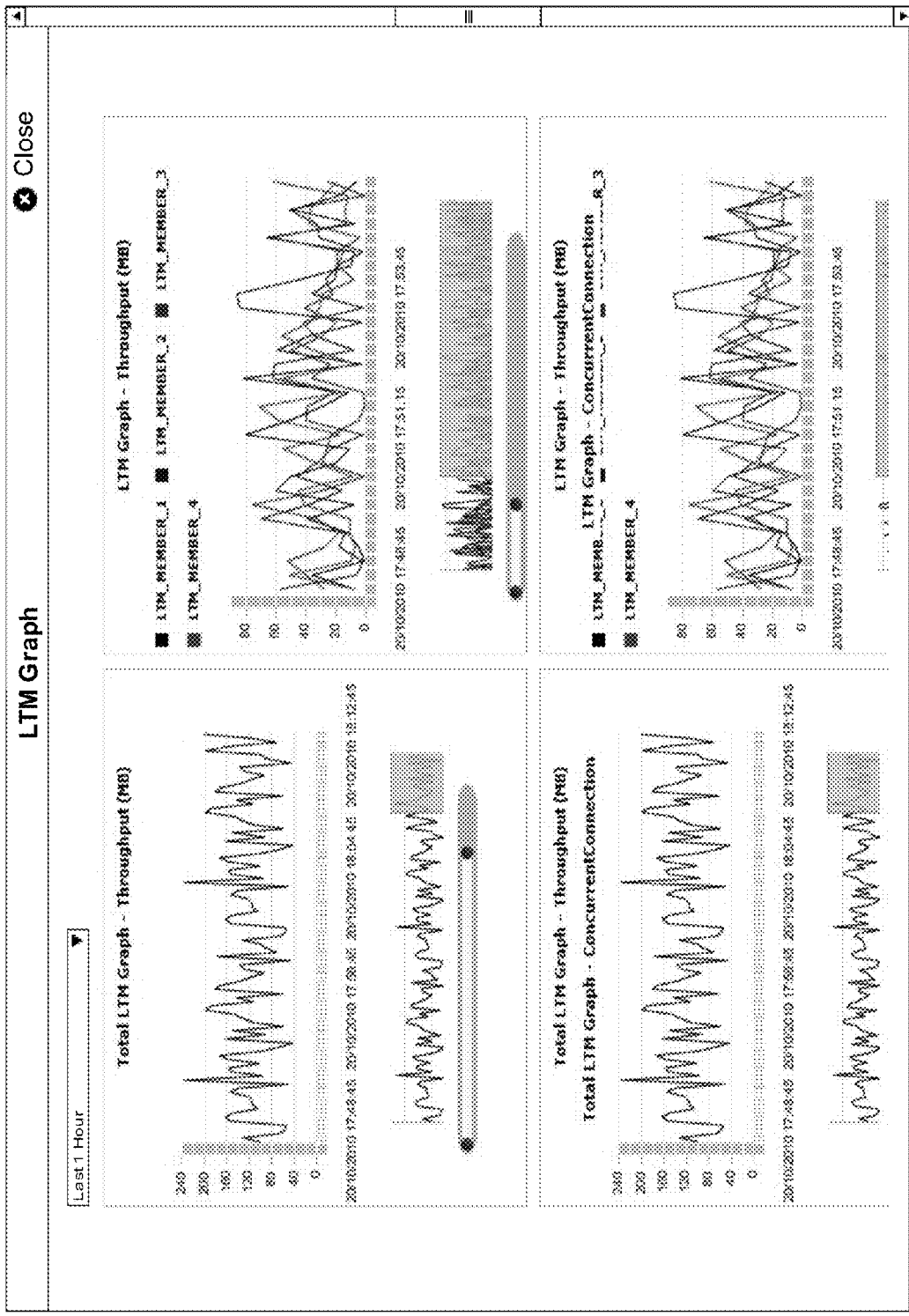
FIG. 12D illustrates a graphical representation of a LTM (Local Traffic Manager) Pool level of a selected node according to an embodiment herein.

FIG. 12D illustrates a graphical representation 1212 of an LtmPool level of a selected node according to an embodiment herein. The graph displays for the LtmPool level of a node includes six different graphs, out of which three graphs are cumulative graphs, while the remaining three graphs represent individual LtmPool member statistic data. The LtmPool graph can be mainly classified into concurrent connections, packets, and throughput.

In one embodiment, the centralized application management system 106 has a protocol which provides agent based interaction with the devices. An agent in a network device acts as a mediator between the manager and the device. The one or more users 102A-N of the centralized application management system 106 has a preference to view hourly, monthly and yearly reports on the devices statistics. A device IP address and an access information are required to configure the devices to the centralized application management system 106.

In another embodiment, the centralized application management system 106 monitors data power using service oriented architecture (SOA) appliances with a protocol and controls routing by adding a new member to a load balancing group or by modifying properties of the existing members such as admin state, weight, etc. The centralized application management system 106 provides reports on traffic and system usage statistics of appliances.

In yet another embodiment, a workflow management system of the centralized application management system 106 allows the one or more users 102A-N to have automatic and manual workflow based deployment for profiles, monitors and other components. The centralized application management system 106 creates templates for configuring profiles, monitors, etc. Once the template is created, the operators can add values to the created templates. The centralized application management system 106 supports creation of work orders and sets of commands for deploying a configuration, reviewing, and validating changes before deployment. The workflow based deployment provides better process control. Using the centralized application management system 106, the one or more users 102A-N can deploy the workflow manually as well as automatically.

A generic alerting system of the centralized application management system 106 alerts the one or more users 102A-N on a health of the one or more datacenters 110A-N and the one or more ASNC's 112A1-Nn. The centralized application management system 106 has the ability to learn from a statistics trend, analyze the performance of the one or more datacenters 110A-N and the one or more ASNC's 112A1-Nn and alert one or more users 102A-N before something goes wrong/malfunction.

The centralized application management system 106 provides detailed application analytics to capture the application events such as user logins, user actions, user visits to particular applications and custom counters.

ADCs (Application Delivery Controllers) such as a Citrix Netscalers are integrated with the centralized application management system 106 through web services. The centralized application management system 106 monitors Citrix Netscaler based on the parameters such as CPU utilization, disk utilization, memory utilization and TCP statistics.

The centralized application management system 106 provides the one or more users 102A-N an option to integrate with a ticketing system. Whenever a threshold limit is exceeded for CPU utilization 1002, memory utilization 1004, throughput 1006 and concurrent connections 1008, the centralized application management system 106 generates tickets automatically in the integrated ticketing systems.

The centralized application management system 106 allows the one or more users 102A-N to change the configuration and to log the configuration changes. It also allows the one or more users 102A-N to edit the log and implement a new configuration. Whenever a configuration is updated, it will be tracked using audit logs. The one or more users 102A-N can update the audit log according to a user needs and implement the audit log using the centralized application management system 106 without much manual work. The one or more users 102A-N maintains or loads multiple configurations for a particular LTM and compares the parameters such as difference comparison, last change, etc.

Once the details of LTMs and GTMs fed into the centralized application management system 106, it automatically backup the details based on frequency and time set for auto backup. The centralized application management system 106 may also back up license files, model numbers, software versions, and serial numbers to compare an invoice against an installed base on a network.

Figure 13:
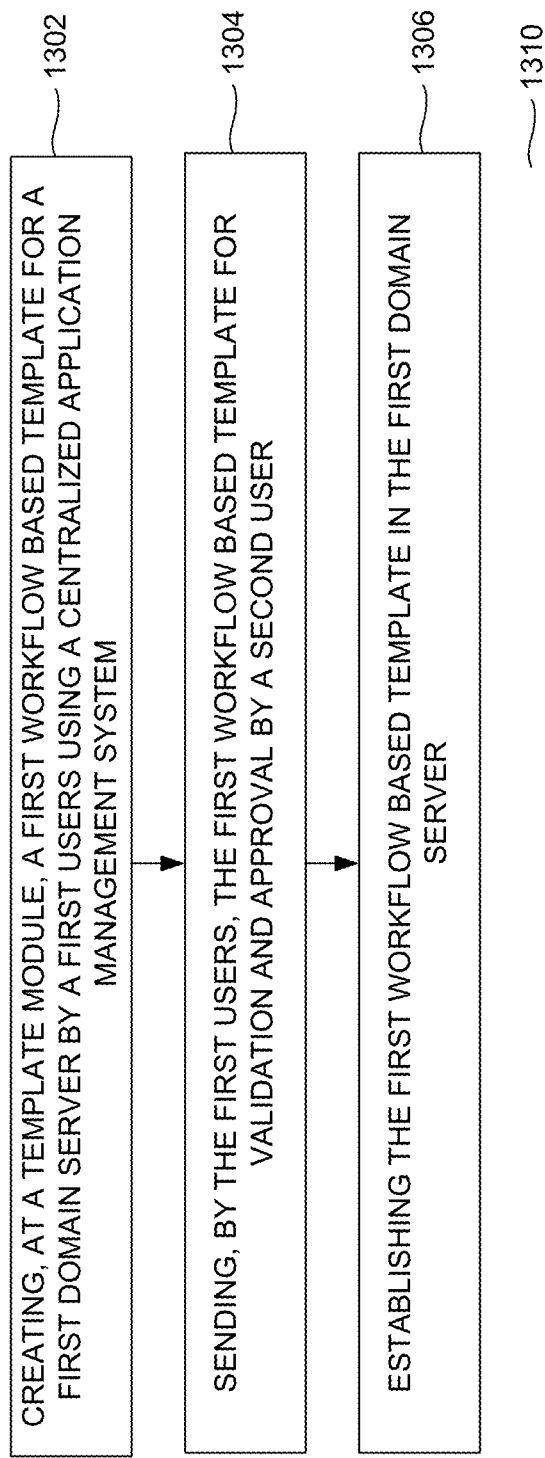
FIG. 13 is a flow diagram illustrates a method for creating and establishing one or more workflow based template for one or more domain servers using a centralized application management system according to an embodiment herein.

FIG. 13 is a flow diagram illustrates a method for creating and establishing one or more workflow based template for one or more domain servers 114A1-Nn using a centralized application management system 106 of FIG. 1 according to an embodiment herein. In step 1302, the one or more users 102A-N creates a first workflow based template for a first domain server 114A1. In one embodiment, the first workflow bases template is at least one workflow based template comprises a Wide IP (WIP) template and a Virtual IP (VIP) template. The first workflow includes one or more root nodes. The one or more root nodes include one or more parent nodes. The one or more parent nodes include a pool node that defines properties of one or more pools. The one or more pools include one or more pool members. The one or more parent nodes further comprises an iRule node that defines an iRule for the one or more pools. In Step 1304, the first workflow based template is send to the one or more users 102A-N for validation and approval. In step 1306, the first workflow based template is established in the first domain server 114A1.

Figure 14:
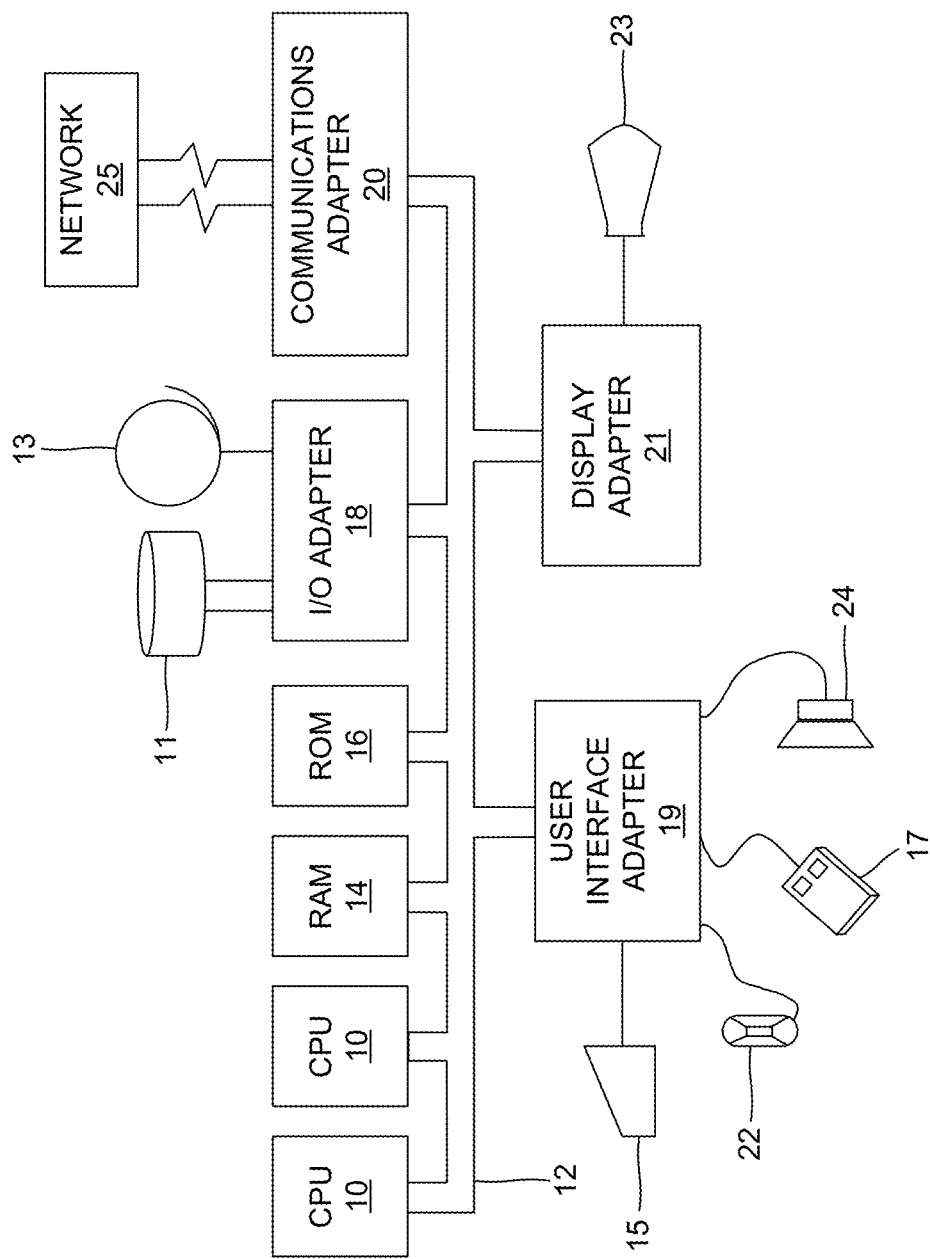
FIG. 14 illustrates a schematic diagram of a computer architecture used in accordance with the embodiments herein.

FIG. 14 illustrates a schematic diagram of a computer architecture used in accordance with the embodiments herein. The computer architecture includes one or more processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The computer architecture further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. A computer implemented method for creating and establishing at least one workflow based template for a plurality of domain servers by a plurality of users using a centralized application management system, wherein said plurality of users comprises a first user and a second user, said computer implemented method comprising:

creating, at a template module, executed by a processor, a first workflow based template for said plurality of domain servers by said first user;

generating a graphical representation of said first workflow based template, wherein said graphical representation of said first workflow based template comprises at least one root node, wherein said at least one root node comprises a plurality of parent nodes;

adding a pool node to each of said plurality of parent nodes based on an input received from said first user;

defining, at said pool node, properties of a plurality of pools based on said input received from said first user, wherein said plurality of pools comprises a first pool and a second pool, wherein said first pool and said second pool comprise a plurality of pool members;

defining properties of said plurality of pool members based on said input received from said first user, wherein said plurality of pool members are selected from said plurality of domain servers;

adding an iRule node to each of said plurality of parent nodes based on said input received from said first user;

defining, at said iRule node, an iRule for said plurality of pools based on said input received from said first user, wherein said iRule node comprises a first iRule and a second iRule, wherein said first iRule and said second iRule define said first pool and said second pool;

sending, based on said input received from said first user, said first workflow based template for validation and approval by said second user; and establishing said first workflow based template in said plurality of domain servers.

2. The computer implemented method of claim 1, wherein said at least one workflow based template comprises a Wide IP (WIP) template and a Virtual IP (VIP) template.

3. The computer implemented method of claim 1, wherein said plurality of parent nodes comprises a name and a description for said first workflow based template.

4. The computer implemented method of claim 1, wherein said properties of each of said plurality of pool members comprises a name, a state and a health monitor of each of said plurality of pool members.

5. The computer implemented method of claim 1, wherein said properties of each of said plurality of pool comprises a persistence, a last resort pool, and/or a persistence TTL (Time To Live).

6. A system for creating and establishing at least one workflow based template for a plurality of domain servers by a plurality of users, wherein said plurality of users comprises a first user and a second user, said system comprising:
a memory unit that stores a database and a set of modules;
a display unit; and
a processor that executes said set of modules, wherein said set of modules comprises;
a template module, executed by said processor, that is configured to create a first workflow based template for said plurality of domain servers by said first user, wherein said template module is further configured to
(a) generate a graphical representation of said first workflow based template, wherein said graphical representation of said first workflow based template comprises at least one root node, wherein said at least one root node comprises a plurality of parent nodes, wherein each of said plurality parent nodes comprises a pool node and an iRule node;
(b) define properties of a plurality of pools based on an input received from said first user, wherein said plurality of pools comprises a first pool and a second pool, wherein said first pool and said second pool comprise a plurality of pool members;
(c) define an iRule for said plurality of pools based on said input received from said first user, wherein said iRule node comprises a first iRule and a second iRule, wherein said first iRule and said second iRule define said first pool and said second pool; and
(d) define properties of said plurality of pool members based on said input received from said first user, wherein said plurality of pool members are selected from said plurality of domain servers,
wherein said first workflow based template is sent to said second user for validation and approval by said first user.

7. The system of claim 6, wherein said first workflow based template is established in said plurality of domain servers.

8. The system of claim 6, wherein said at least one workflow based template comprises a Wide IP (WIP) template and a Virtual IP (VIP) template.

9. The system of claim 6, wherein said properties of each of said plurality of pool members comprises a name, a state and a health monitor of each of said plurality of pool members.

10. A non-transitory program storage device readable by computer, and comprising a program of instructions executable by said computer to perform a method for creating and establishing at least one workflow based template for a plurality of domain servers by a plurality of users using a centralized application management system, wherein said plurality of users comprises a first user and a second user, said method comprising:
creating, at a template module, executed by said processor, a first workflow based template for said plurality of domain servers by said first user;
generating a graphical representation of said first workflow based template, wherein said graphical representation of said first workflow based template comprises at least one root node, wherein said at least one root node comprises a plurality of parent nodes;
adding a pool node to each of said plurality of parent nodes based on an input received from said first users;
defining, at said pool node, properties of a plurality of pools based on said input received from said first user, wherein said plurality of pools comprises a first pool and a second pool, wherein said first pool and said second pool comprise a plurality of pool members;
defining properties of said plurality of pool members based on said input received from said first user, wherein said plurality of pool members are selected from said plurality of domain servers;
adding an iRule node to each of said plurality of parent nodes based on said input received from said first user;
defining, at said iRule node, an iRule for said plurality of pools based on said input received from said first user, wherein said iRule node comprises a first iRule and a second iRule, wherein said first iRule and said second iRule define said first pool and said second pool;
sending, based on said input received from said first user, said first workflow based template for validation and approval by said second user; and
establishing said first workflow based template in said plurality of domain servers.

11. The non-transitory program storage device 10, wherein said at least one workflow based template comprises a Wide IP (WIP) template and a Virtual IP (VIP) template.

12. The non-transitory program storage device 10, wherein said properties of each of said plurality of pool members comprises a name, a state and a health monitor of each of said plurality of pool members.

* * * * *